(12) United States Patent
Moon et al.

(10) Patent No.: US 9,967,626 B2
(45) Date of Patent: *May 8, 2018

(54) VIDEO DISPLAY APPARATUS AND OPERATING METHOD THEREOF

(71) Applicant: LG ELECTRONICS INC., Seoul (KR)

(72) Inventors: Kyoungsoo Moon, Seoul (KR); Joonhui Lee, Seoul (KR); Hyeonjae Lee, Seoul (KR); Jinpil Kim, Seoul (KR); Aettie Ji, Seoul (KR); Kyungho Kim, Seoul (KR); Sanghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

This patent is subject to a terminal disclaimer.

(21) Appl. No.: 14/550,280

(22) Filed: Nov. 21, 2014

(65) Prior Publication Data

US 2015/0150036 A1 May 28, 2015

Related U.S. Application Data

(63) Continuation of application No. 13/883,631, filed as application No. PCT/KR2013/000094 on Jan. 7, 2013.
(Continued)

(51) Int. Cl.
*H04H 60/32* (2008.01)
*H04N 21/4722* (2011.01)
(Continued)

(52) U.S. Cl.
CPC .......... *H04N 21/4722* (2013.01); *B05D 1/26* (2013.01); *B05D 1/28* (2013.01); *B05D 1/36* (2013.01); *B05D 1/38* (2013.01); *B05D 3/0254* (2013.01); *B05D 5/00* (2013.01); *B05D 7/52* (2013.01); *B05D 7/54* (2013.01); *B05D 7/544* (2013.01); *B05D 7/546* (2013.01); *D21H 19/20* (2013.01);
(Continued)

(58) Field of Classification Search
None
See application file for complete search history.

(56) References Cited

U.S. PATENT DOCUMENTS 8,407,741 B2 3/2013 Lee et al.
2002/0062484 A1 5/2002 De Lange et al.
(Continued)

*Primary Examiner* — Jefferey F Harold
*Assistant Examiner* — Samira Monshi
(74) *Attorney, Agent, or Firm* — Dentons US LLP

(57) ABSTRACT

Provided are a video display device and a method of operating the same. The method includes: executing an enhanced service playing application not dependent on any single channel; obtaining an uncompressed audio video (AV) content; playing the uncompressed AV content through the display unit; attempting to obtain contents information on the uncompressed AV content on the basis of a part of the uncompressed AV content; transmitting an enhanced service request message to an enhanced service providing server not dependent on any single channel by the enhanced service; receiving an enhanced service from the enhanced service providing server; and playing the enhanced service through the display unit by the enhanced service playing application.

9 Claims, 44 Drawing Sheets

Related U.S. Application Data

(60) Provisional application No. 61/585,208, filed on Jan. 10, 2012, provisional application No. 61/583,621, filed on Jan. 6, 2012, provisional application No. 61/583,189, filed on Jan. 5, 2012.

(51) Int. Cl.

| | | |
|---|---|---|
| *B05D 3/02* | (2006.01) | |
| *B05D 1/26* | (2006.01) | |
| *B05D 1/28* | (2006.01) | |
| *B05D 1/36* | (2006.01) | |
| *B05D 1/38* | (2006.01) | |
| *B05D 5/00* | (2006.01) | |
| *B05D 7/00* | (2006.01) | |
| *H04N 21/222* | (2011.01) | |
| *H04N 21/462* | (2011.01) | |
| *H04N 21/24* | (2011.01) | |
| *H04N 21/431* | (2011.01) | |
| *H04N 21/81* | (2011.01) | |
| *D21H 19/20* | (2006.01) | |
| *D21H 23/56* | (2006.01) | |
| *H04N 21/2665* | (2011.01) | |

(52) U.S. Cl.
CPC ........... *D21H 23/56* (2013.01); *H04N 21/222* (2013.01); *H04N 21/2407* (2013.01); *H04N 21/2665* (2013.01); *H04N 21/4316* (2013.01); *H04N 21/4622* (2013.01); *H04N 21/8173* (2013.01); *B05D 2203/00* (2013.01)

(56) References Cited

U.S. PATENT DOCUMENTS

| | | |
|---|---|---|
| 2002/0080161 A1 | 6/2002 | St. Maurice et al. |
| 2002/0157101 A1 | 10/2002 | Schrader et al. |
| 2004/0189873 A1 | 9/2004 | Konig et al. |
| 2004/0237120 A1 | 11/2004 | Lewing et al. |
| 2006/0123451 A1 | 6/2006 | Preisman |
| 2006/0187358 A1 | 8/2006 | Lienhart et al. |
| 2007/0154013 A1 | 7/2007 | Kato et al. |
| 2007/0294740 A1 | 12/2007 | Drake et al. |
| 2008/0010664 A1 | 1/2008 | Pelizza et al. |
| 2008/0046919 A1 | 2/2008 | Carmi et al. |
| 2008/0177858 A1 | 7/2008 | Aarnio et al. |
| 2009/0319373 A1 | 12/2009 | Barrett |
| 2010/0272414 A1* | 10/2010 | Reneris ............ H04N 21/4882 386/291 |
| 2010/0313217 A1* | 12/2010 | Bassali ............ H04N 21/23424 725/32 |
| 2011/0055867 A1 | 3/2011 | Lee et al. |
| 2012/0117584 A1* | 5/2012 | Gordon ................ H04N 21/254 725/19 |
| 2012/0210342 A1 | 8/2012 | Gonzalez et al. |
| 2012/0291059 A1* | 11/2012 | Roberts ............ H04N 21/41407 725/25 |
| 2014/0189725 A1 | 7/2014 | Klein et al. |

\* cited by examiner

FIG.14
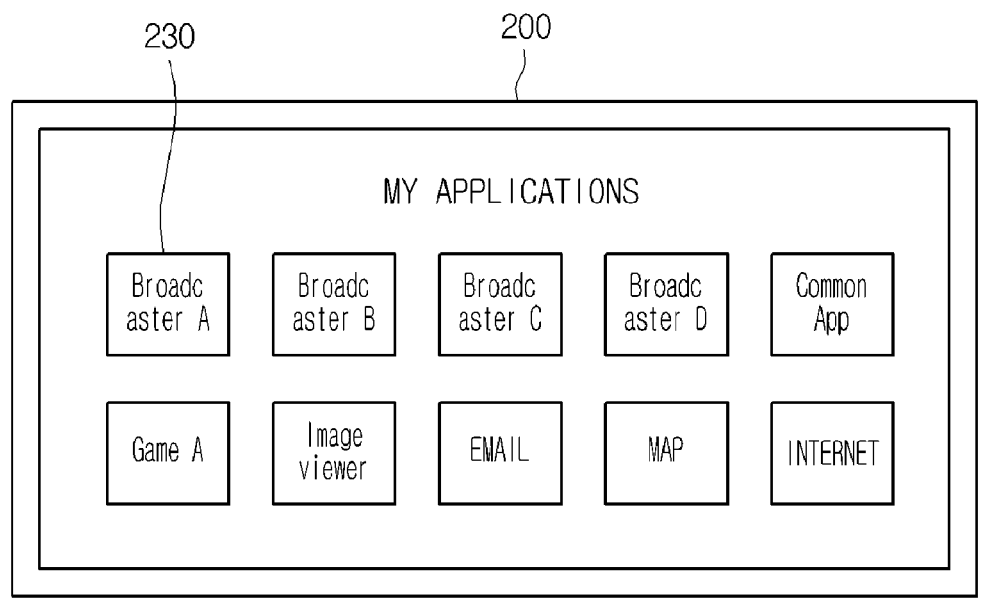
(A)
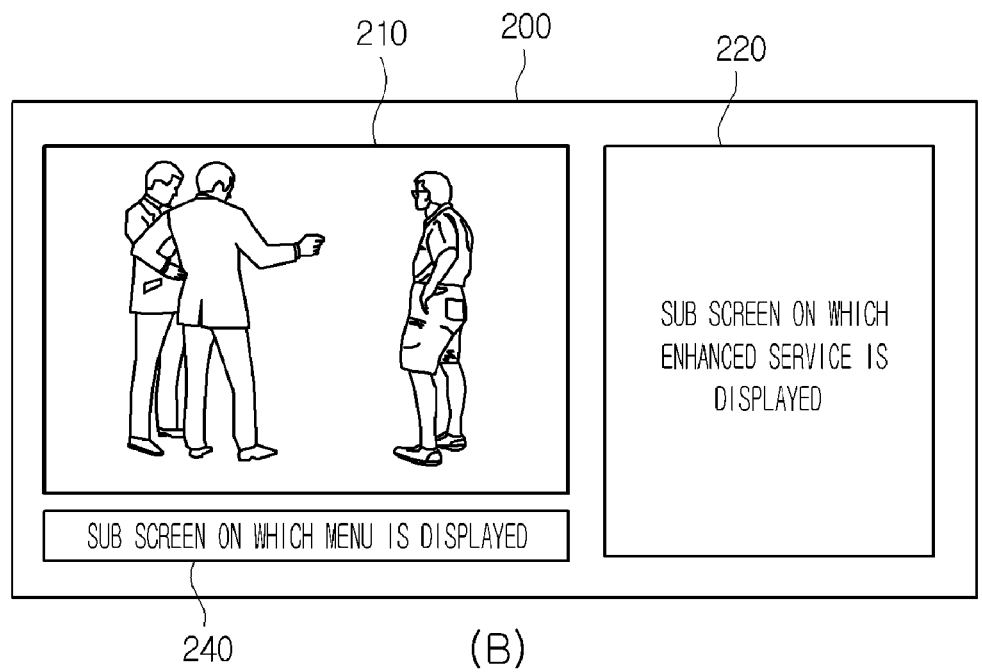
(B)

FIG.31
Terminal ID:0097383LV00  
Model name: oooooo  
firmware Version: 5.123  
User ID: ARG2930  
Age: 30  
Gender: F  
Region: KOREA OO CITY OO DONG  
...
| Time | ch. | Cnnten ID | Title | Category | Content Time | ... |
|---|---|---|---|---|---|---|
| 20110818153940GMT | SBS | SC00384MGKE | GUARD BOSS EPISODE 1 | DRAMA | 30:49 | ... |
| ... | | | | | | |
| 20110818153932GMT | SBS | SC00384MGKE | GUARD BOSS EPISODE 1 | DRAMA | 46:40 | ... |
| 20110882180911GMT | SBS | SC00384MGKE | GUARD BOSS EPISODE 2 | DRAMA | 12:32 | ... |
| 20110824195024GMT | SBS | SC00384MGKE | GUARD BOSS EPISODE 3 | DRAMA | 11:33 | ... |
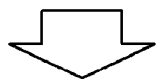
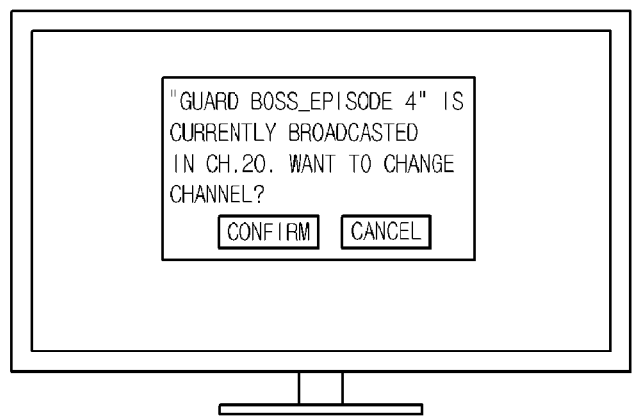

VIDEO DISPLAY APPARATUS AND OPERATING METHOD THEREOF

This application is a continuation of U.S. application Ser. No. 13/883,631, filed May 6, 2013, which is a National Stage of International Application No. PCT/KR2013/000094, filed Jan. 7, 2013, and claims the benefit of U.S. Provisional Application No. 61/585,208, filed on Jan. 10, 2012, 61/583,621, filed on Jan. 6, 2012, and 61/583,189 filed on Jan. 5, 2012, all of which are hereby incorporated by reference as if fully set forth herein

TECHNICAL FIELD

The present disclosure relates to a video display device and a method of operating the same.

BACKGROUND ART

As digital broadcasting is paving the way for its extensive spread, a broadcasting station transmits both main audio-visual (AV) contents and enhanced service data, which may be linked to the main AV contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting receiving device is compelled to receive an enhanced service dependent on the MVPD.

Since the broadcast receiving device extracts main AV data from signal received from the MVPD and provides only uncompressed audio-visual data to a video display device, only enhanced services provided from the broadcast receiving device not the video display device are available.

DISCLOSURE OF INVENTION

Technical Problem

Embodiments provide a video display device available for enhanced services not dependent on an MVPD and a method of operating the same.

Solution to Problem

A method of operating a video display device including a display unit according to one embodiment, comprises: executing an enhanced service playing application not dependent on any single channel; obtaining an uncompressed audio video (AV) content; playing the uncompressed AV content through the display unit; attempting to obtain contents information on the uncompressed AV content on the basis of a part of the uncompressed AV content; transmitting an enhanced service request message to an enhanced service providing server not dependent on any single channel by the enhanced service playing application; receiving an enhanced service from the enhanced service providing server; and playing the enhanced service through the display unit by the enhanced service playing application.

A video display device according to another embodiment, comprises: a display unit; a receiving unit obtaining an uncompressed AV content; an enhancement service management unit executing an enhanced service playing application not dependent on a specific channel, obtaining contents information on the uncompressed AV content on the basis of a part of the uncompressed AV content, and attempting to obtain an enhanced service on the basis of the contents information; and a playback control unit playing the uncompressed AV content on the display unit, wherein the enhanced service playing application transmits an enhanced service request message to an enhanced service providing server not dependent on a specific channel, receives an enhanced server from the enhanced service providing server, and plays the enhanced service on the display unit.

BRIEF DESCRIPTION OF DRAWINGS

FIG. 14 is a screen when a content provider application is executed according to an embodiment.

FIGS. 31 to 34 are conceptual diagrams of a user characteristic based enhanced service according to an embodiment.

MODE FOR THE INVENTION

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

Figure 1:
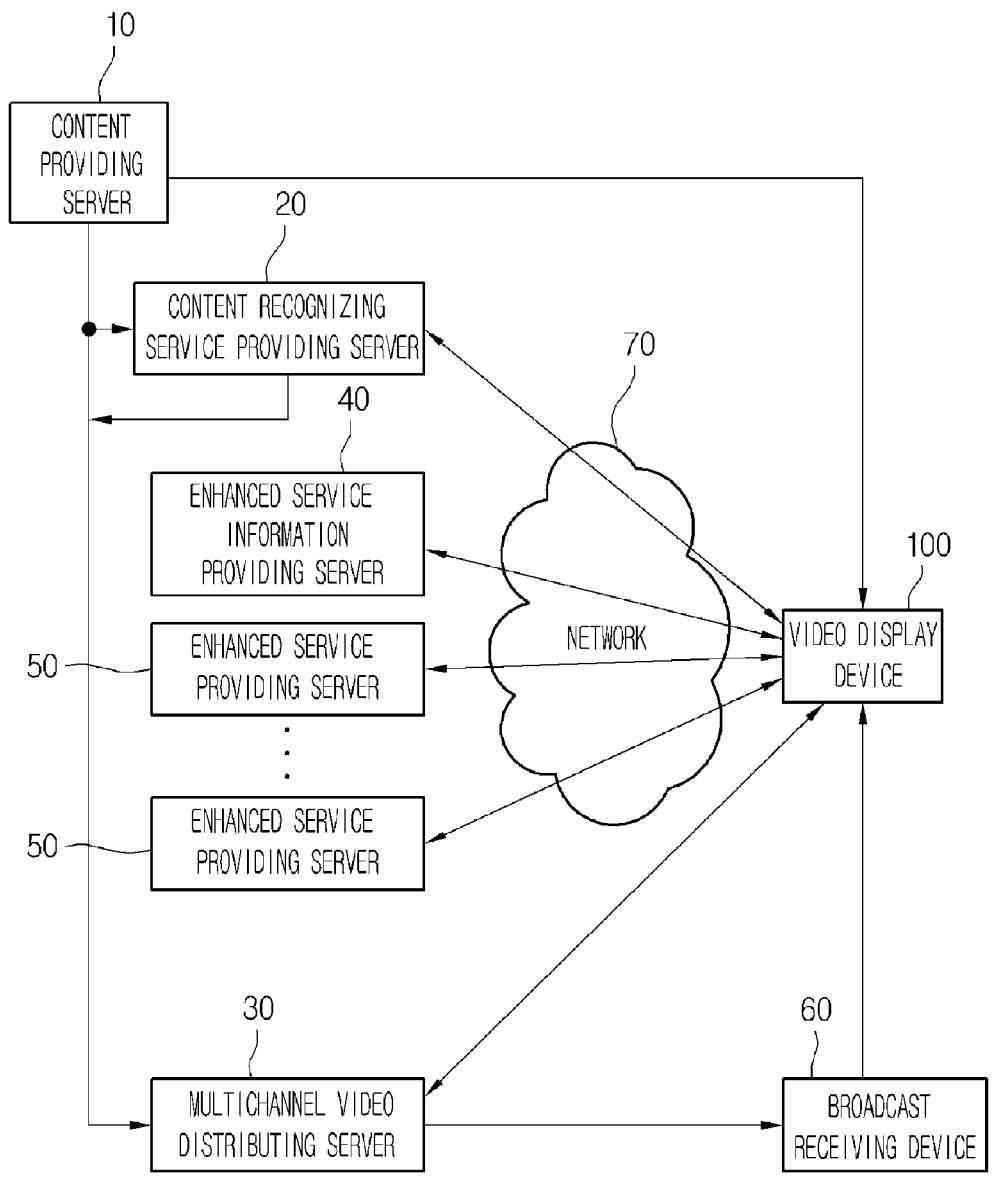
FIG. 1 is a block diagram illustrating the network topology according to the embodiment.

FIG. 1 is a block diagram illustrating the network topology according to the embodiment.

As shown in FIG. 1, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and stores it. This feature information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 100 may be a television, a notebook computer, a hand phone, and a smart phone, each including a display unit. The video display device 100 may receive an uncompressed main AV content from the broadcast receiving device 60 or a broadcast signal including an encoded main AV content from the contents providing server 10 or the multi channel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 2:
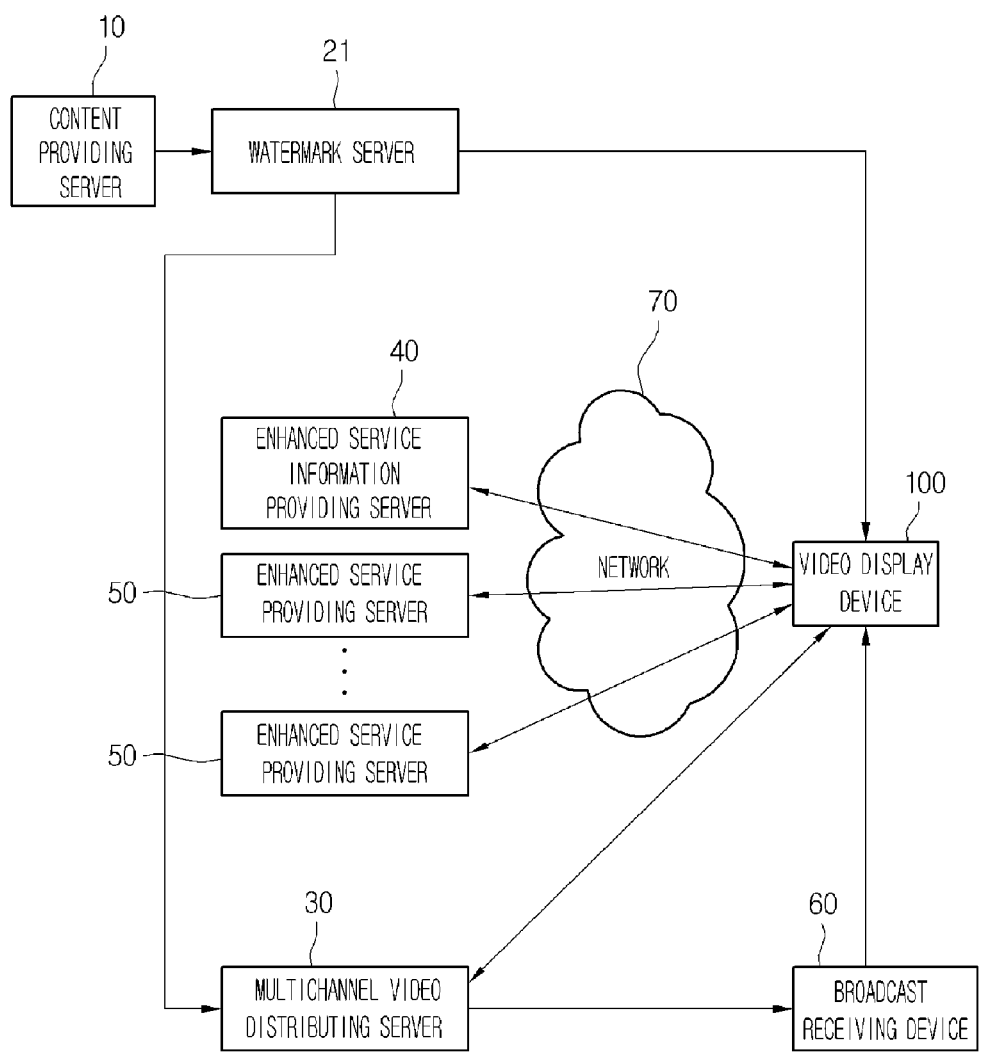
FIG. 2 is a block diagram illustrating a watermark based network topology according to an embodiment.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is process for inserting information, which may be almost undeletable, into a digital signal; For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 3:
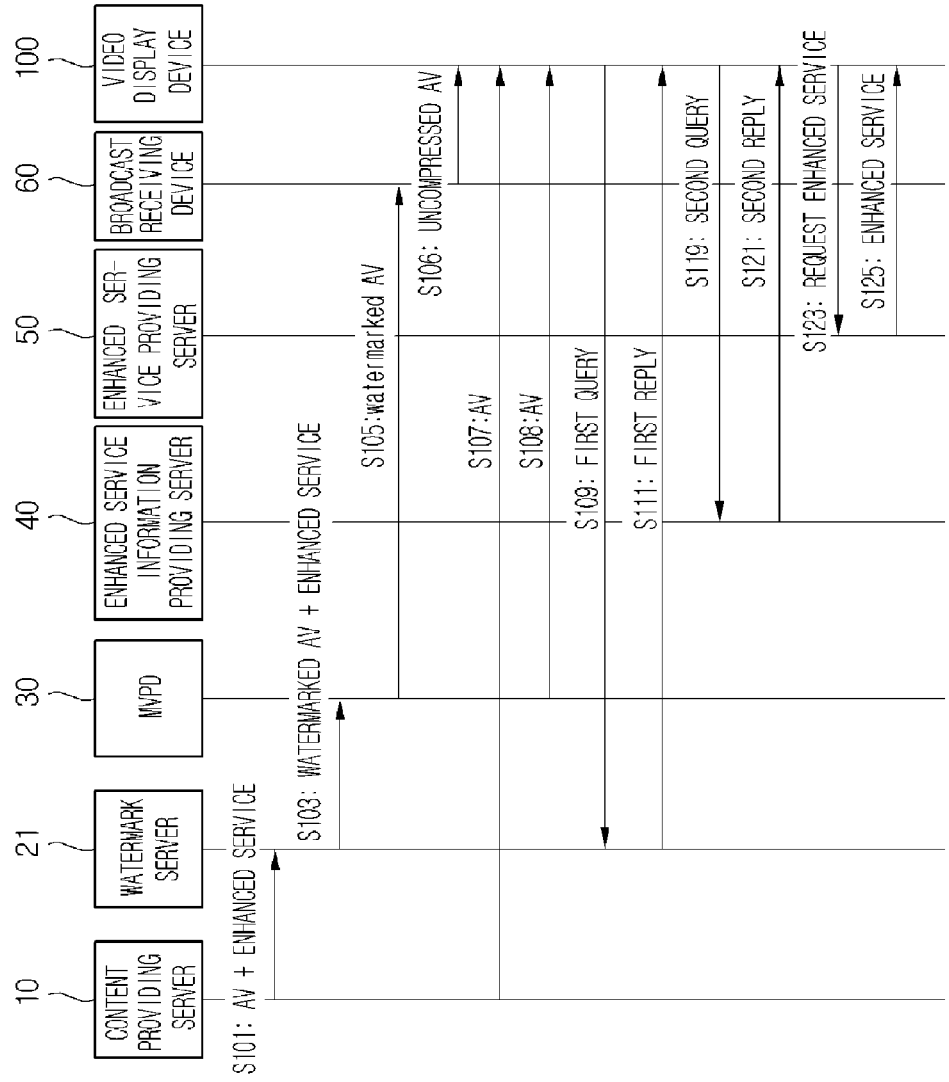
FIG. 3 is a ladder diagram illustrating a data flow in a watermark based network topology according to an embodiment.

FIG. 3 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information of the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service; a usage information reporting address, a usage information reporting period, and the minimum usage time for usage information acquisition.

The acquisition path of available enhanced service may be represented with IP or Advanced Television Systems Committee-Mobile/Handheld (ATSC MIH). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 100 without going through the broadcast receiving device 60 in operation S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from some frames or a section of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

Figure 4:
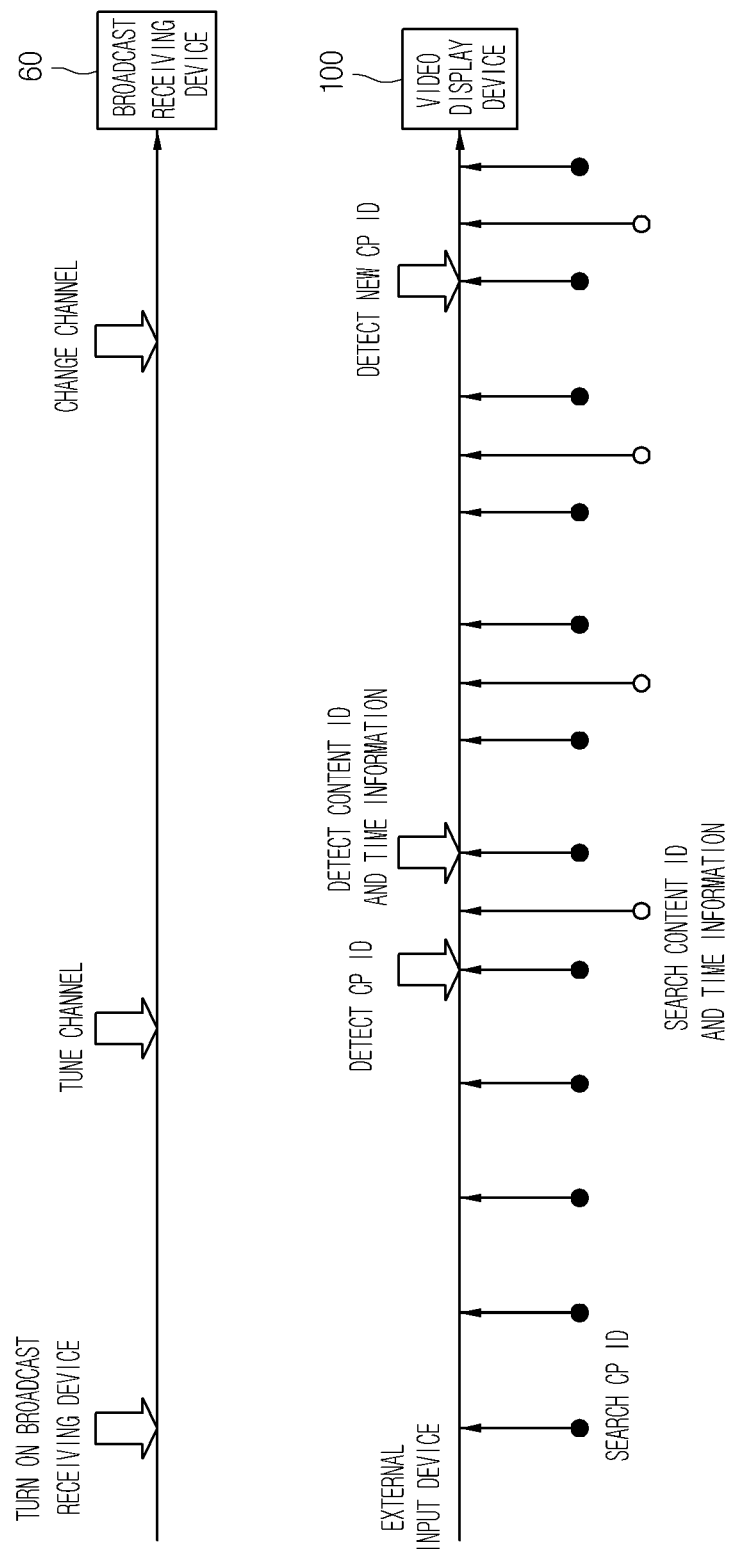
FIG. 4 is view illustrating a watermark based content recognition timing according to an embodiment.

FIG. 4 is a view illustrating a watermark based content recognition timing according to an embodiment.

As shown in FIG. 4, when the broadcast receiving device 60 is turned on and tunes a channel, and also, the video display device 100 receives a main AV content of the turned channel from the broadcast receiving device 60 through an external input port 111, the video display device 100 may sense a content provider identifier (or a broadcasting station identifier) from the watermark of the main AV content. Then, the video display device 100 may sense content information from the watermark of the main AV content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

Figure 5:
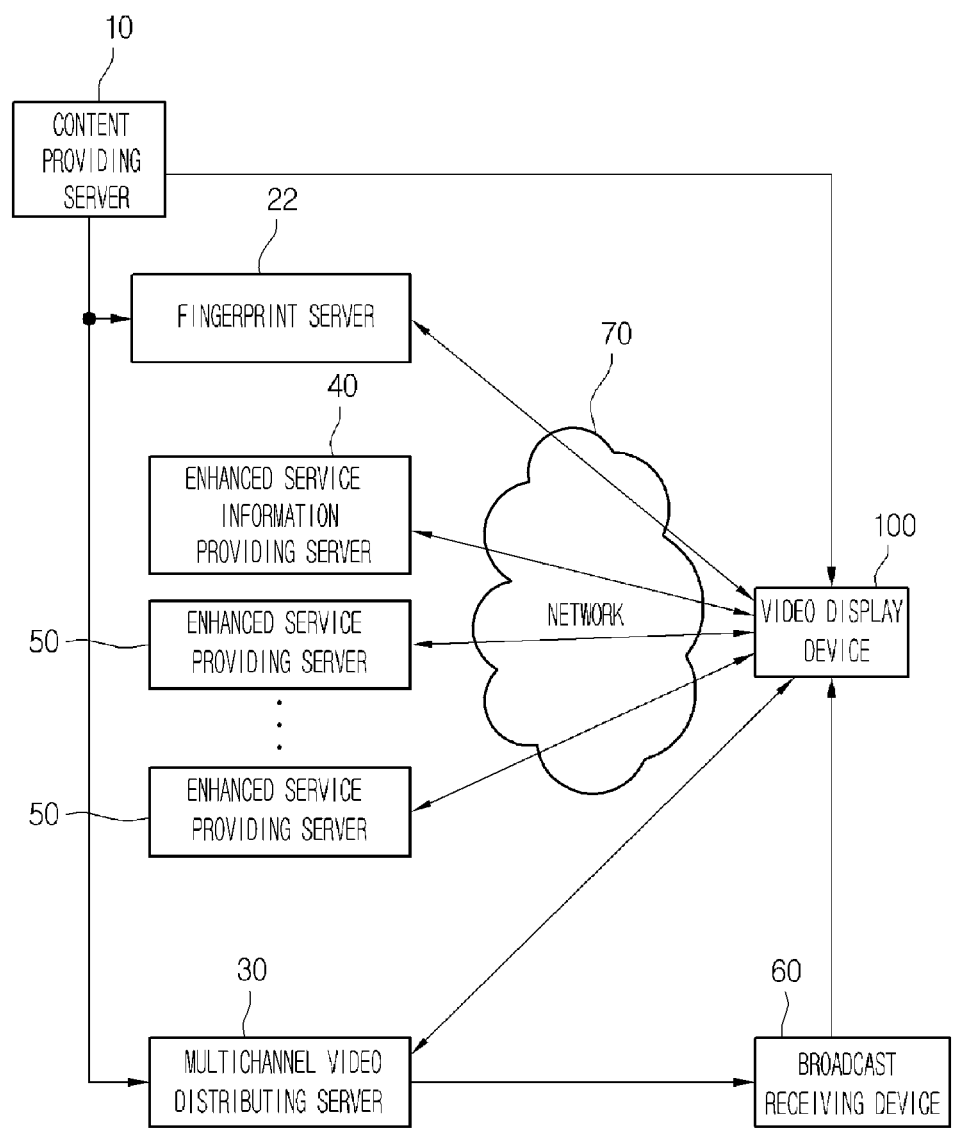
FIG. 5 is a block diagram illustrating a fingerprint based network topology according to an embodiment.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main AV content, but extracts feature information from some frames or a section of audio samples of the main AV content and stores the extracted feature information. Then, when receiving the feature information from the video display device 100, the fingerprint server 22 provides an identifier and time information of an AV content corresponding to the received feature information.

Figure 6:
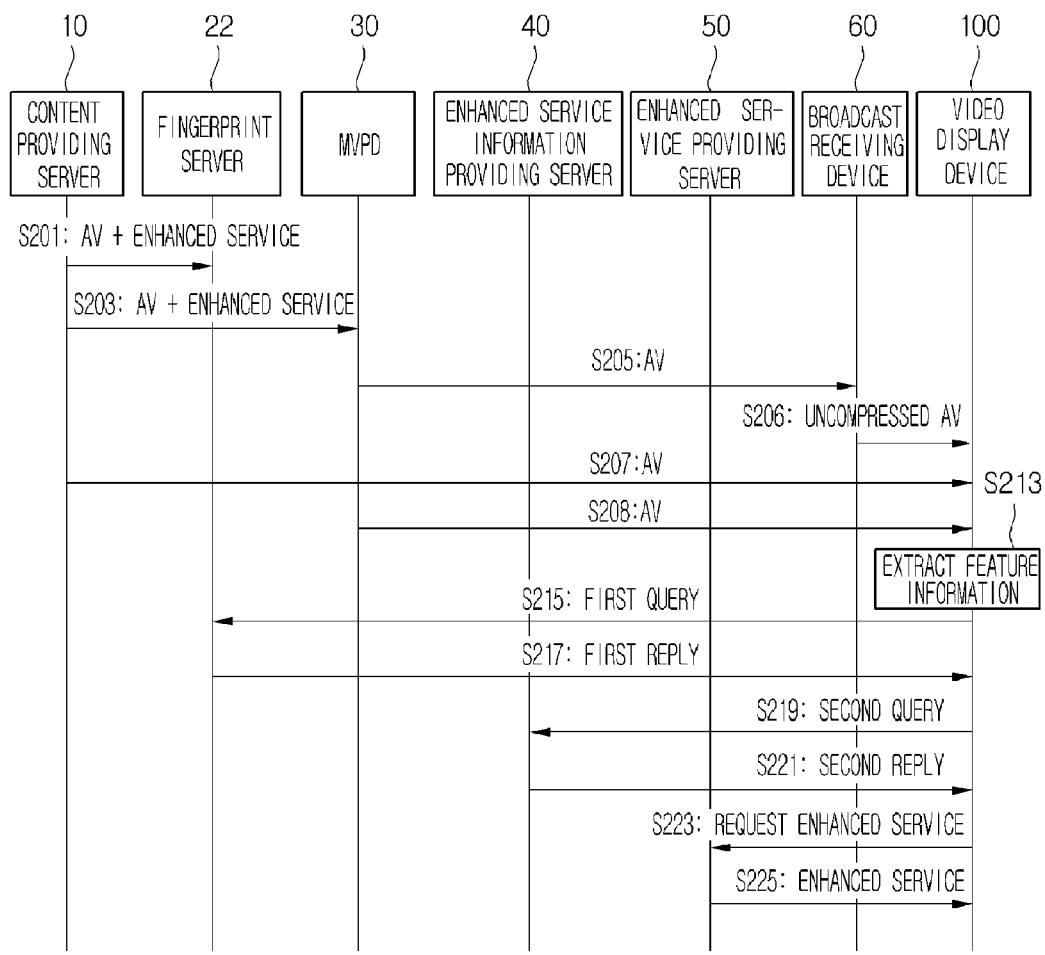
FIG. 6 is a ladder diagram illustrating a data flow in a fingerprint based network topology according to an embodiment.

FIG. 6 is a ladder diagram illustrating a data flow in a fingerprint based network topology according to an embodiment.

First, the content providing server 10 transmits a broadcast signal including a main AV content and an enhanced service in operation S201.

The fingerprint server 22 receives a broadcast signal that the content providing server 10, extracts a plurality of pieces of feature information from a plurality of frame sections or a plurality of audio sections of the main AV content, and establishes a database for a plurality of query results corresponding to the plurality of feature information in operation S203. The query result may include at least one of content information, enhanced service information, and an available enhanced service.

The MVPD 30 receives broadcast signals including a main AV content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S206.

Moreover, the content providing server 10 also broadcasts a broadcast signal including a main AV content through a wireless channel in operation S207.

Additionally, the MVPD 30 may directly transmit a broadcast signal including a main AV content to the video display device 100 without going through the broadcast receiving device 60.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts feature information from some frames or a section of audio samples of the obtained main AV content in operation S213.

The video display device 100 accesses the fingerprint server 22 corresponding to the predetermined fingerprint server address to transmit a first query including the extracted feature information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described with reference to FIG. 7 and Table 1.

Figure 7:
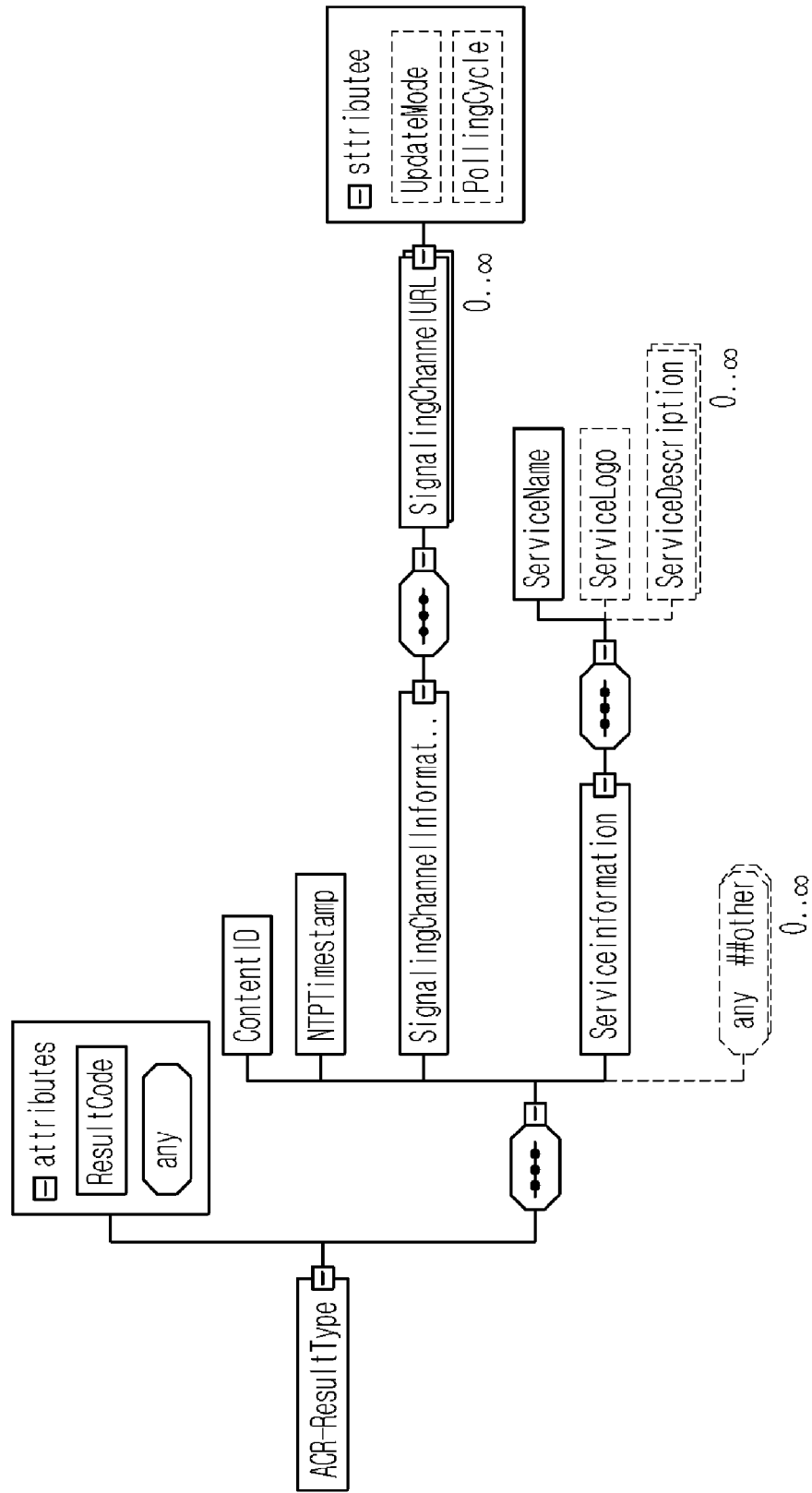
FIG. 7 is a view illustrating an XML schema diagram of ACR-Resulttype containing a query result according to an embodiment.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTP-Timestamp, SignalingChannelInformation, and Service-Information elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 illustrates an XML schema of ACR-ResultType containing the query result.

TABLE 1

```
<xs:complexType name ="ACR-ResultType">
    <xs:sequence>
        <xs:element name="ContentID"type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL"
                    maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                    type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="x:anyURI"
                    minOccurs="0"/>
                    <xs:element name="ServiceDescription" type="xs:string"
minOccurs="0" maxOccurs="unbounded"/>
                </xs:sequence>
            </xs:complexType>
        </xs:element>
        <xs:any namespace="##other" processContents="skip"
minOccurs="0" maxOccurs="unbounded"/>
    </xs:sequence>
    <xs:attribute name="ResultCode" type="xs:string" use="required"/>
    <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_identifier( ) { | | |
|   TSID | 16 | uimsbf |
|   reserved | 2 | bslbf |
|   end_of_day | 5 | uimsbf |
|   unique_for | 9 | uimsbf |
|   content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
  urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major>69) is "0". <serviceid> is defined with <major> or <minor>. <major> represent a Major Channel number, and <minor> represents a Minor Channel Number.

Examples of the global service identifier are as follows.
  urn:oma:bcast:iauth:atsc:service:us:1234:5.1
  urn:oma:bcast:iauth:atsc:service:us:0:100.200

Moreover, as the ContentID element, an ATSC content identifier may be used as described below.

The ATSC content identifier has the following form.
  urn:oma:bcast:iauth:atsc:content<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major >69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 8:
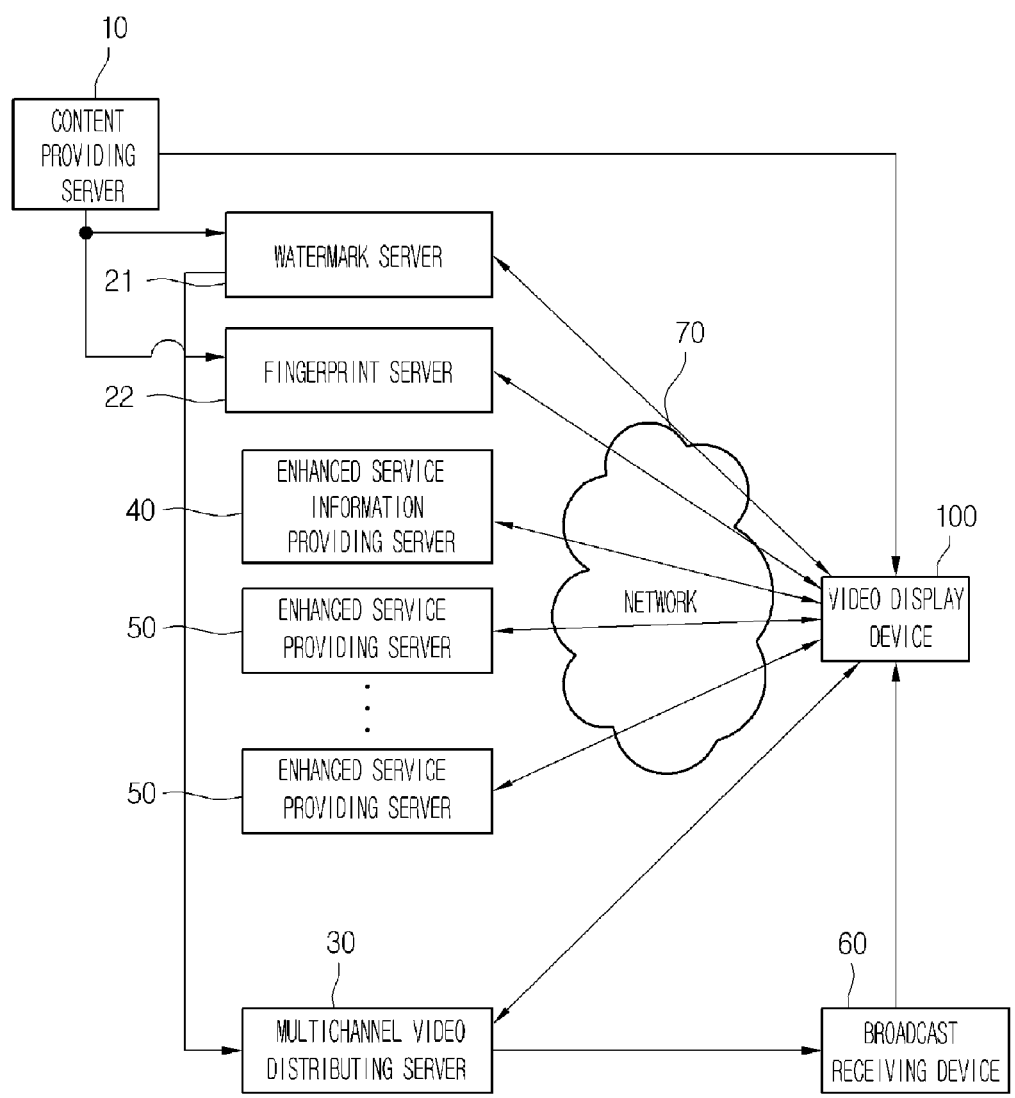
FIG. 8 is a block diagram illustrating a watermark and fingerprint based network topology according to an embodiment.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts feature information from some frames or a certain section of audio samples of the main AV content and stores the extracted feature information. Then, when receiving the feature information from the video display device 100, the fingerprint server 22 provides an identifier and time information of an AV content corresponding to the received feature information.

Figure 9:
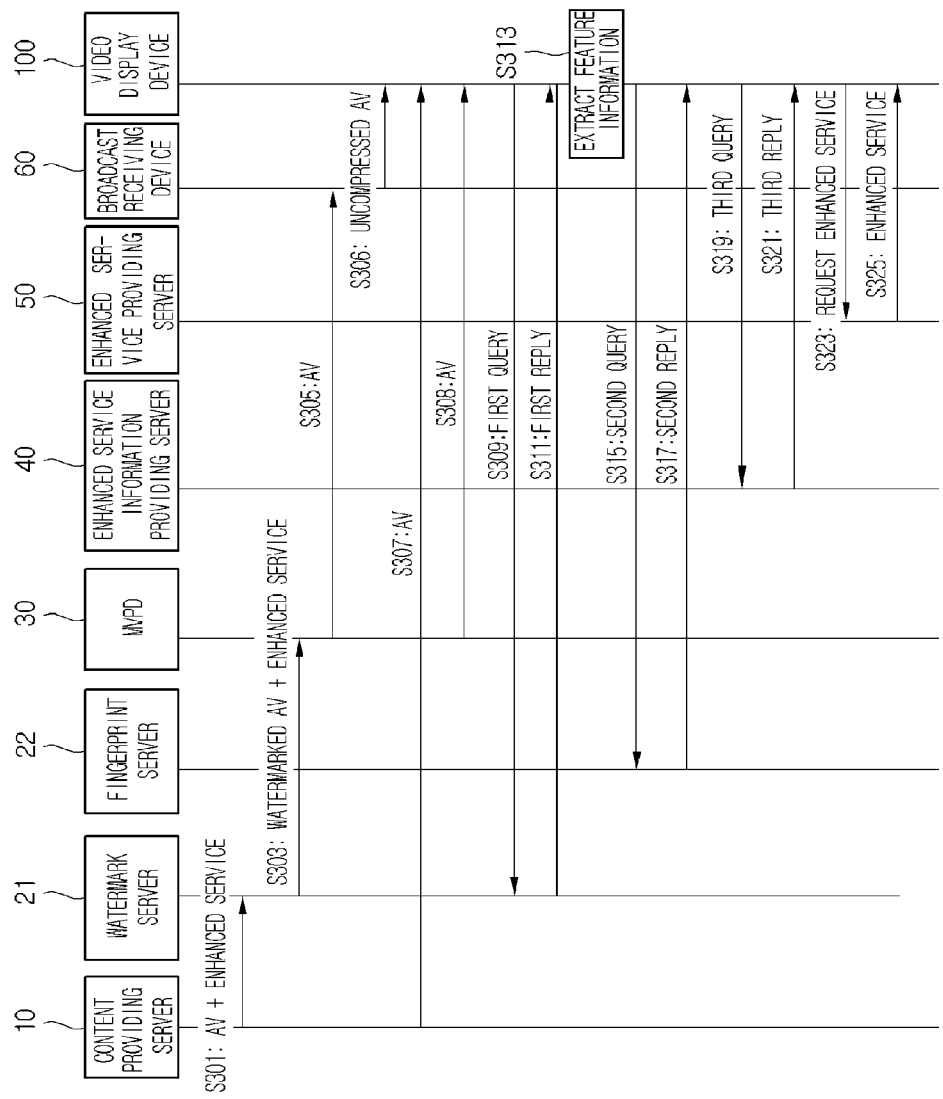
FIG. 9 is a ladder diagram illustrating a data flow in a watermark and fingerprint based network topology according to an embodiment.

FIG. 9 is a ladder diagram illustrating a data flow in a watermark and fingerprint based network topology according to an embodiment.

First, the content providing server 10 transmits a broadcast signal including a main AV content and an enhanced service in operation S301.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S306.

Moreover, the content providing server 10 also broadcasts a broadcast signal including a main AV content through a wireless channel in operation S307.

Additionally, the MVPD 30 may directly transmit a broadcast signal including a main AV content to the video display device 100 without going through the broadcast receiving device 60 in operation S308.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from audio samples in some frames or periods of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts feature information from some frames or a certain section of audio samples of the main AV content in operation S313.

The video display device 100 accesses the fingerprint server 22 corresponding to the fingerprint server address in the first reply to transmit a second query including the extracted feature information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIG. 10, the video display device 100 will be described according to an embodiment.

Figure 10:
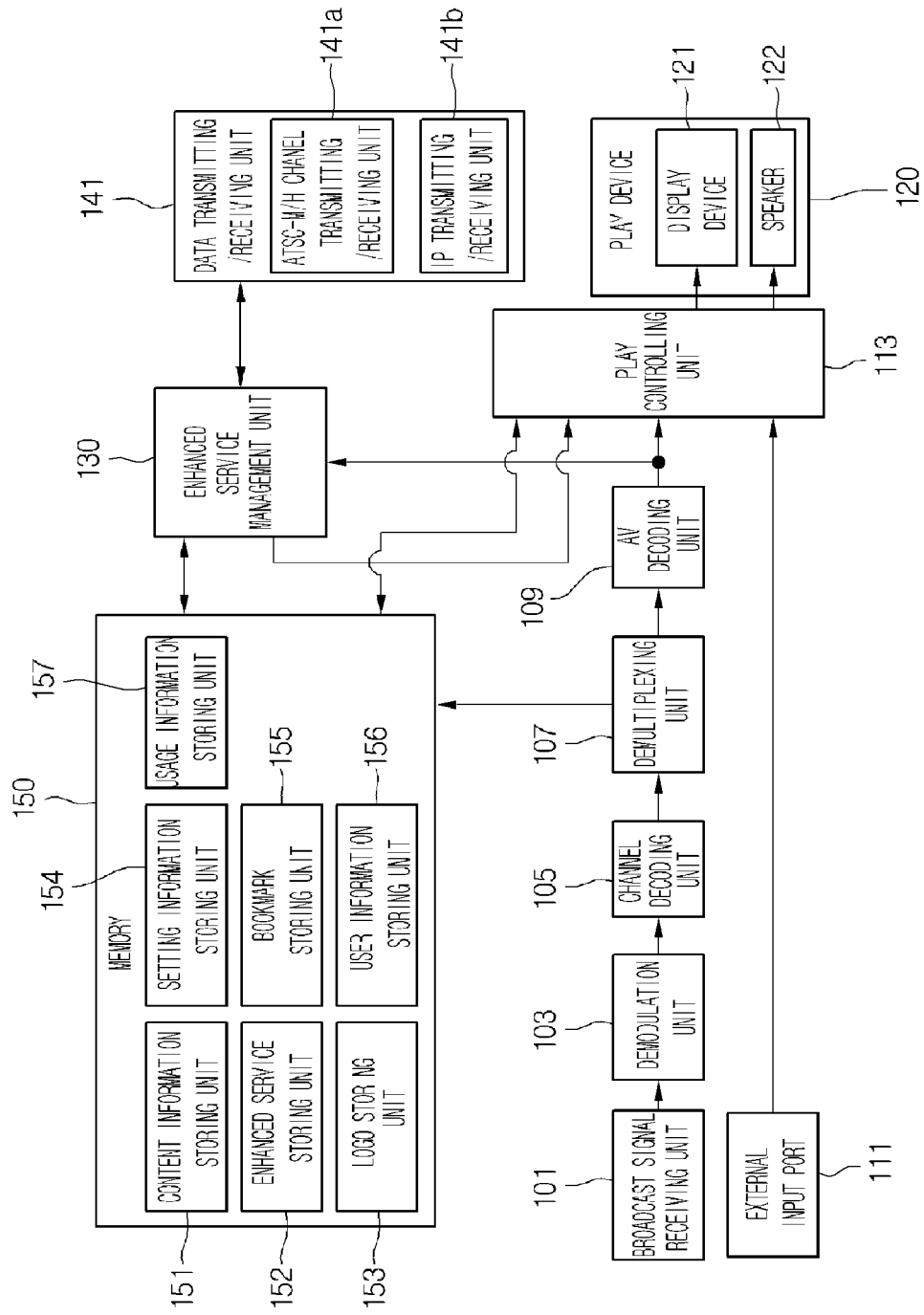
FIG. 10 is a block diagram illustrating the video display device according to the embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main AV content that the AV decoding unit 109 generates and an uncompressed main AV content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main AV content and obtains available enhanced service on the basis of the obtained content information. Especially, as described above, the enhanced service management unit 130 may obtain the identification information of the main AV content on the basis of some frames or a certain section of audio samples the uncompressed main AV content. This is called automatic contents recognition (ACR) in this specification.

The data transmitting/receiving unit 141 may include an Advanced Television Systems Committee-Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of feature information.

The enhanced service storage unit 152 may store a plurality of enhanced services corresponding to a plurality of feature information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main AV content watching information and enhanced service usage information within the set range. The usage information range may be set in each virtual channel. Additionally, the usage information measurement allowable range may be set over an entire physical channel.

The usage information providing unit 157 stores the main AV content watching information and the enhanced service usage information, which are collected by the video display device 100. Additionally, the video display device 100 analyzes a service usage pattern on the basis of the collected main AV content watching information and enhanced service usage information, and stores the analyzed service usage pattern in the usage information storage unit 157.

The enhanced service management unit 130 may obtain the content information of the main AV content from the fingerprint server 22 or the content information storage unit 151. If there is no content information or sufficient content information, which corresponds to the extracted feature information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Then, referring to FIGS. 11 and 12, a method of synchronizing a playback time of a main AV content with a playback time of an enhanced service according to an embodiment will be described.

Figure 11:
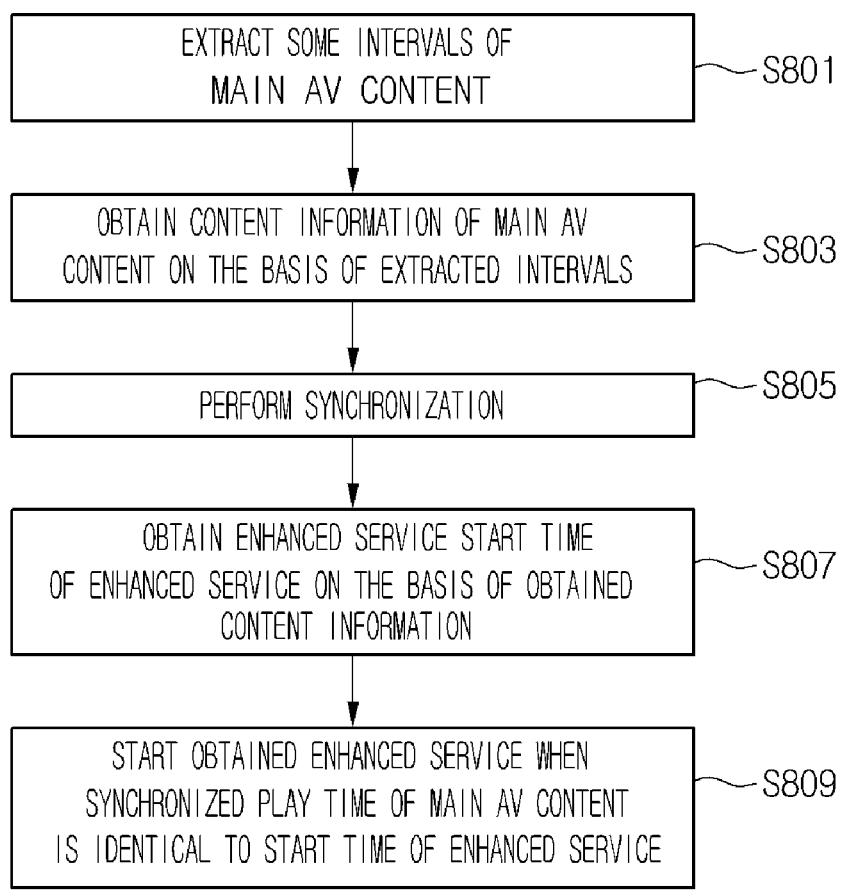
FIG. 11 is a flowchart illustrating a method of synchronizing a playback time of a main AV content with a playback time of an enhanced service according to an embodiment.

FIG. 11 is a flowchart illustrating a method of synchronizing a playback time of a main AV content with a playback time of an enhanced service according to an embodiment.

Enhanced service information may include a start time of an enhanced service. At this point, the video display device 100 may need to start the enhanced service at the start time. However, since the video display device 100 receives a signal transmitting an uncompressed main AV content with no time stamp, the reference time of a plying time of the main AV content is different from that of a start time of the enhanced service. Although the video display device 100 receives a main AV content having time information, the reference time of a plying time of the main AV content may be different from that of a start time of the enhanced service, like rebroadcasting. Accordingly, the video display device 100 may need to synchronize the reference time of the main AV content with that of the enhanced service. Especially, the video display device 100 may need to synchronize the playback time of the main AV content with the start time of the enhanced service.

First, the enhanced service management unit 130 extracts a certain section of a main AV content in operation S801. The section of the main AV content may include at least one of some video frames or a certain audio section of the main AV content. Time that the enhanced service management unit 130 extracts the section of the main AV content is designated as Tn.

The enhanced service management unit 130 obtains content information of a main AV content on the basis of the extracted section. In more detail, the enhanced service management unit 130 decodes information encoded with invisible watermark in the extracted section to obtain content information. Additionally, the enhanced service management unit 130 may extract feature information in the extracted section, and obtain the content information of the main AV content from the fingerprint server 22 or the content information storage unit 151 on the basis of the extracted feature information. Time that the enhanced service management unit 130 obtains the content information is designated as Tm.

Moreover, the content information includes a start time Ts of the extracted section. After the content information acquisition time Tm, the enhanced service management unit 130 synchronizes the playback time of the main AV content with the start time of the enhanced service on the biases of Ts, Tm, and Tn. In more detail, the enhanced service management unit 130 regards the content information acquisition time Tm as a time Tp calculated by the following Equation 1.

$$Tp = Ts + (Tm - Tn) \qquad \text{[Equation 1]}$$

Additionally, the enhanced service management unit 130 regards a time of when Tx elapses after the content information acquisition time as Tp+Tx.

Then, the enhanced service management unit 130 obtains an enhanced service and its start time Ta on the obtained content information in operation S807.

If the synchronized playback time of the main AV content is identical to the start time Ta of the enhanced service, the enhanced service management unit 130 starts the obtained enhanced service in operation S809. In more detail, the enhanced service management unit 130 may start the enhanced service when the following Equation 2 is satisfied.

$$Tp+Tx=Ta \qquad \text{[Equation 2]}$$

Figure 12:
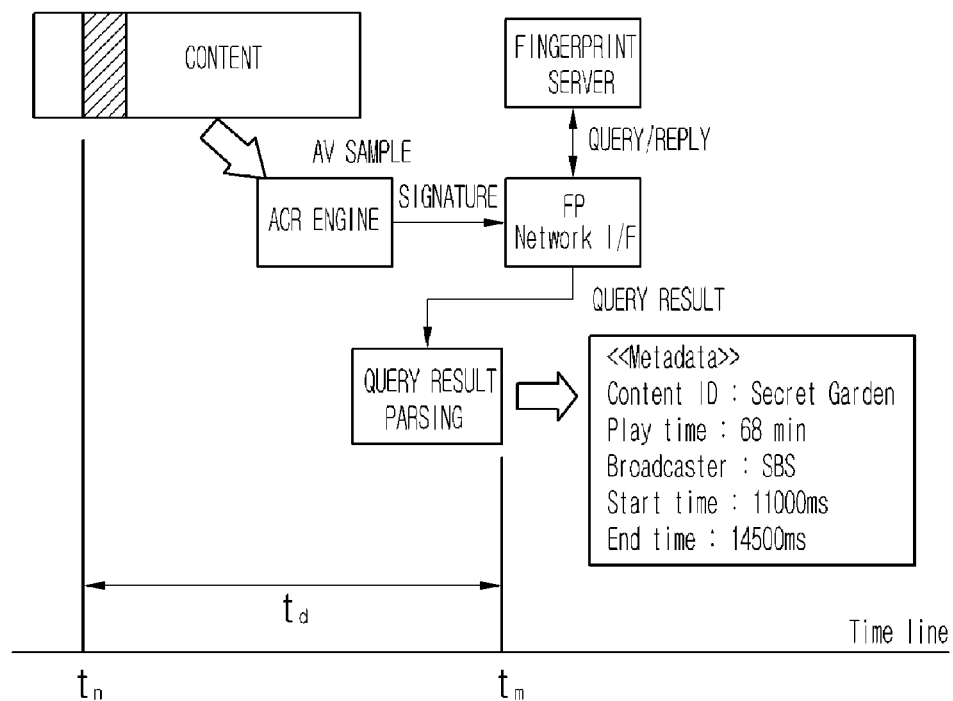
FIG. 12 is a conceptual diagram illustrating a method of synchronizing a playback time of a main AV content with a playback time of an enhanced service according to an embodiment.

FIG. 12 is a conceptual diagram illustrating a method of synchronizing a playback time of a main AV content with a playback time of an enhanced service according to an embodiment.

As shown in FIG. 12, the video display device 100 extracts an AV sample during a system time Tn.

The video display device 100 extracts feature information from the extracted AV sample, and transmits a query including the extracted feature information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed according to Equation 1 as Ts+(Tm−Tn), so that, after that, the playback time of the main AV content may be synchronized with the start time of the enhanced service.

Next, an ACR application will be described according to various embodiments with reference to FIGS. 13 to 14.

The ACR application may include an auto playing application, a content provider application, and a video display manufacturer application.

Figure 13:
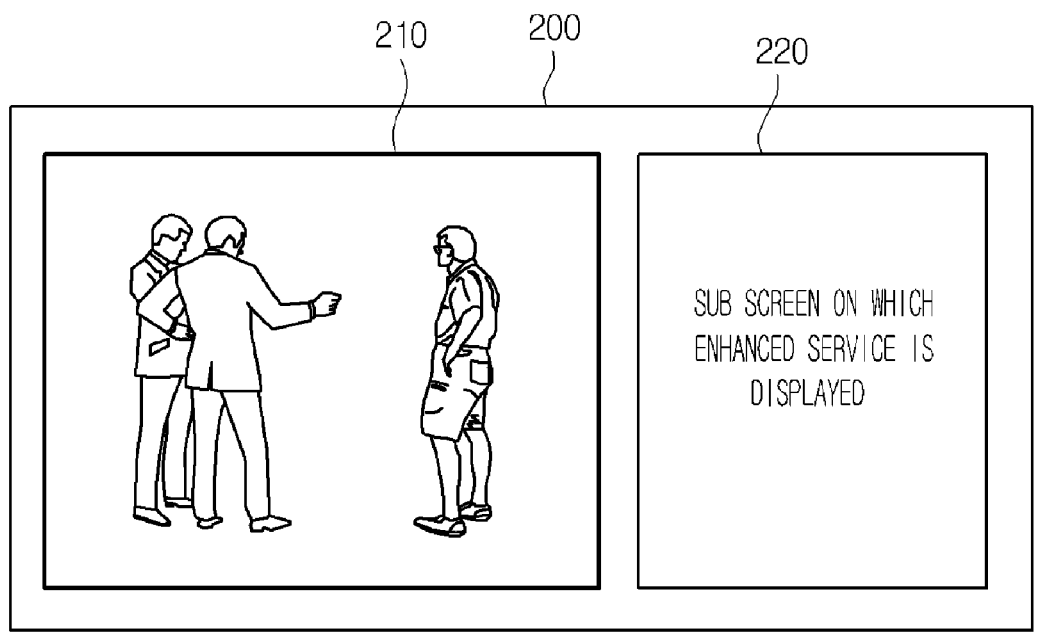
FIG. 13 is a screen when an auto playing application is executed according to an embodiment.

FIG. 13 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main AV content according to a playback time of the main AV content, without a user's input. That is, a content provider or broadcasting station entirely controls the auto playing application. For example, when an auto playing application relates to a specific channel or a specific content, as the video display device 100 enters a channel or content relating to the auto playing application, the video display device 100 may automatically execute a corresponding auto playing application without a user input. Then, when the video display device 100 becomes out of a channel or content relating to an auto playing application, it may automatically terminate a corresponding auto playing application without a user input. In this sense, an auto playing application will be referred to as a channel-dependent application or a content-dependent application in this specification.

As shown in FIG. 13, once the auto playing application is executed, the screen 200 may include a sub screen 210 where a reduced main AV content is played and a sub screen 220 where additional information is displayed. The sub screen 200 where additional information is displayed may be spatially separated from the sub screen 210 where a main AV content is played.

Moreover, when an auto playing application is executed, an area where additional information is displayed may be semi-transparent. In this case, the area where additional information is displayed may overlay on an area where a main AV content played.

FIG. 14 is a screen when a content provider application is executed according to an embodiment.

In this specification, the content provider application is designated as a full interactive application.

As shown in FIG. 14 (A), the video display device 100 downloads and stores a plurality of applications. FIG. 14 (A) illustrates icons 230 of the applications. A content provider application among the plurality of applications is an application created and distributed by a content provider, and thus, may be under control of the content provider.

A user of the video display device 100 may download a content provider application from an application store and determines whether to execute the downloaded content provider application.

FIG. 14 (B) is a screen when a content provider application is executed. As shown in FIG. 14 (B), the screen 200 may include the sub screen 210 where a reduced main AV content is played and the sub screen 220 where additional information is displayed.

Hereinafter, a video display device manufacturer application will be described according to an embodiment with reference to FIGS. 23 to 50.

The video display device manufacturer application is created and controlled by a video display device manufacturer, and may be stored in advance when the video display device 100 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 100 may determine whether to execute the video display device manufacturer application.

The video display device manufacturer application may have two types.

The video display device manufacturer application of the first type has a resizing user interface. The video display device manufacturer application having the resizing user interface reduces the size of an area where a main AV content is displayed to display all the main AV content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main AV content is displayed, and overlaps an area where an application is displayed on the main AV content. Since the area where an application is displayed covers the main AV content, an application area may be semi-transparent.

Like this, a video display device manufacturer application is not dependent on any single contents provider or any single channel. Although it is described that such an application is manufactured by a video display device manufacturer, the present invention is not limited thereto. An application not dependent on any single contents provider or any single channel is not executed by a channel change or is not terminated by a channel change. For convenience of description in this specification, an application not dependent on any single content provider or any single channel may be referred to as a channel-independent application, a video display device manufacturer application or a Live+ app.

Then, an on/off control of an ACR function will be described according to an embodiment with reference to FIGS. 15 and 16.

Figure 15:
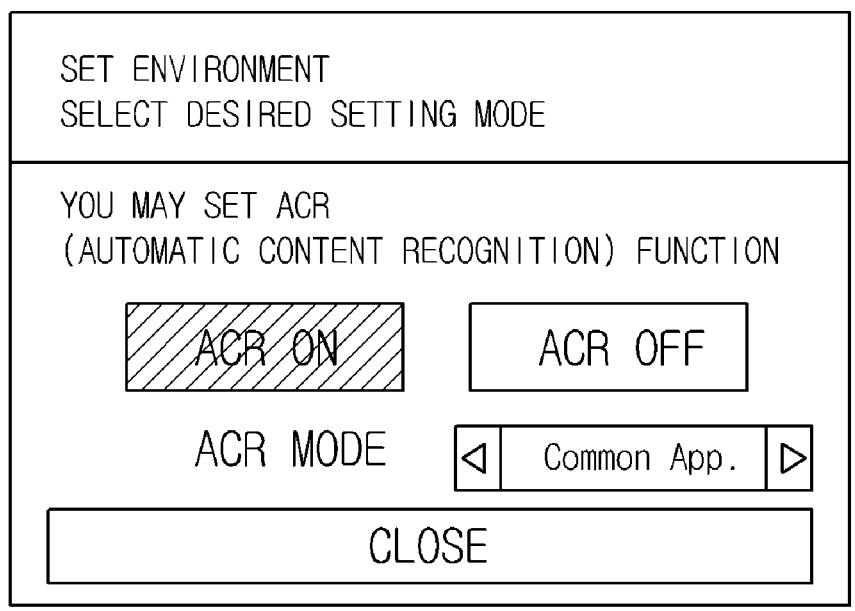
FIG. 15 is a view of a user interface for controlling an ACR function according to an embodiment.

FIG. 15 is a view of a user interface for controlling an ACR function according to an embodiment.

As shown in FIG. 15, the play controlling unit 113 displays an ACR function setting window. A user may activate or deactivate the ACR function through the ACR function setting window.

When the ACR function is activated, a user may select an ACR mode. The ACR mode may be set with one of an auto playing application mode, a content provider application mode, and a video display manufacturer application mode.

When the ACR function mode is set in the above manner, the play controlling unit 113 stores setting information on a setting information storage unit 154.

Figure 16:
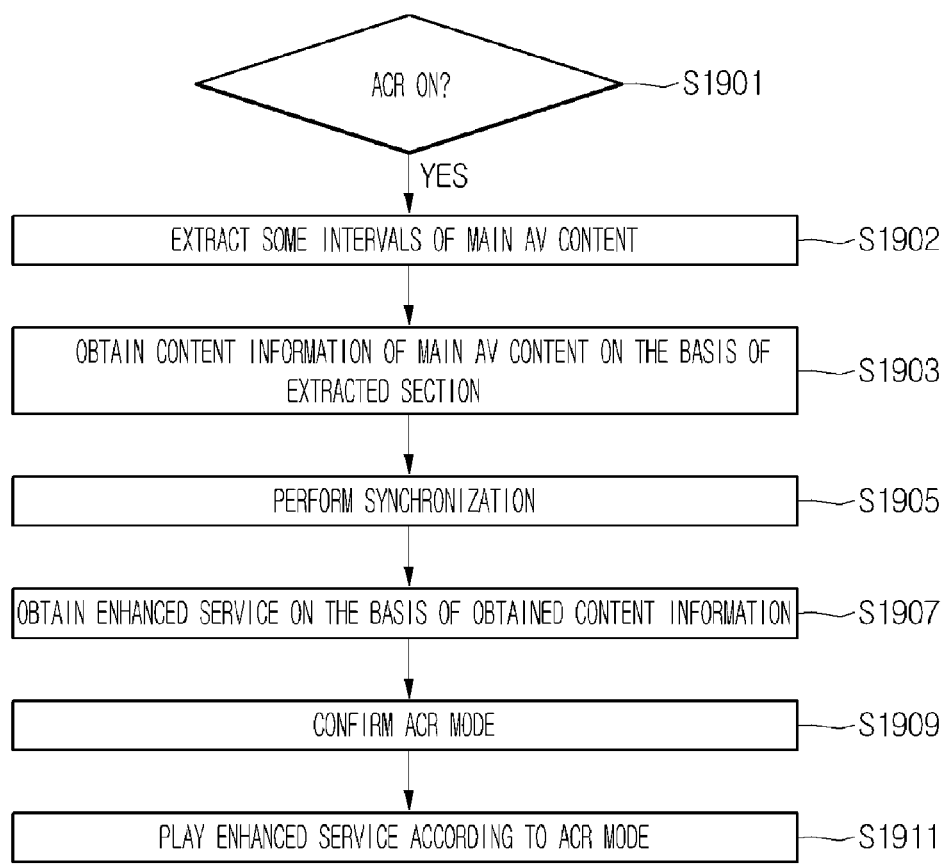
FIG. 16 is a flowchart illustrating a method of controlling a video display device according to the embodiment.

FIG. 16 is a flowchart illustrating a method of operating a video display device according to the embodiment.

The enhanced service management unit 130 confirms whether the ACR function is turned on in operation S1901.

If the ACR function is deactivated, the enhanced service management unit 130 does not perform a content information obtaining procedure any more.

If the ACR function is activated, the enhanced service management unit 130 extracts a certain section of a main AV content in operation S1902.

The enhanced service management unit 130 obtains content information of the main AV content on the basis of the extracted section in operation S1903.

The enhanced service management unit 130 synchronizes the reference time of the main AV content with the reference time of an alternative advertisement in operation S1905.

The enhanced service management unit 130 obtains an enhanced service on the basis of the obtained content information in operation S1907. The enhanced service management unit 130 obtains enhanced service information on the basis of the content information, and then obtains an enhanced service on the basis of the enhanced service information.

Then, the enhanced service management unit 130 confirms the ACR mode in operation S1909.

The enhanced service management unit 130 plays the enhanced service according to the ACR mode in operation S1911.

In more detail, if the ACR mode is an automatic play application mode, the enhanced service management unit 130 executes an automatic play application, and the executed automatic play application plays the obtained enhanced service.

If the ACR mode is the content provider application mode, the enhanced service management unit 130 executes a content provider application corresponding to the obtained content information in background. The enhanced service management unit 130 displays a content provider application when receiving a user input corresponding to an enhanced service use. This content provider application may play the obtained enhanced service. Instead that the content provider application is automatically executed in background, it may be executed by a user input.

If the ACR mode is the video display device manufacturer application mode, the enhanced service management unit 130 executes its video display device manufacturer application in background. The enhanced service management unit 130 displays the video display device manufacturer application when receiving a user input corresponding to an enhanced service use. This video display device manufacturer application may play the obtained enhanced service. Instead that the video display device manufacturer application is automatically executed in background, it may be executed by a user input.

Next, third party enhanced service will be described according to an embodiment of the present invention with reference to FIGS. 17 to 42.

Figure 17:
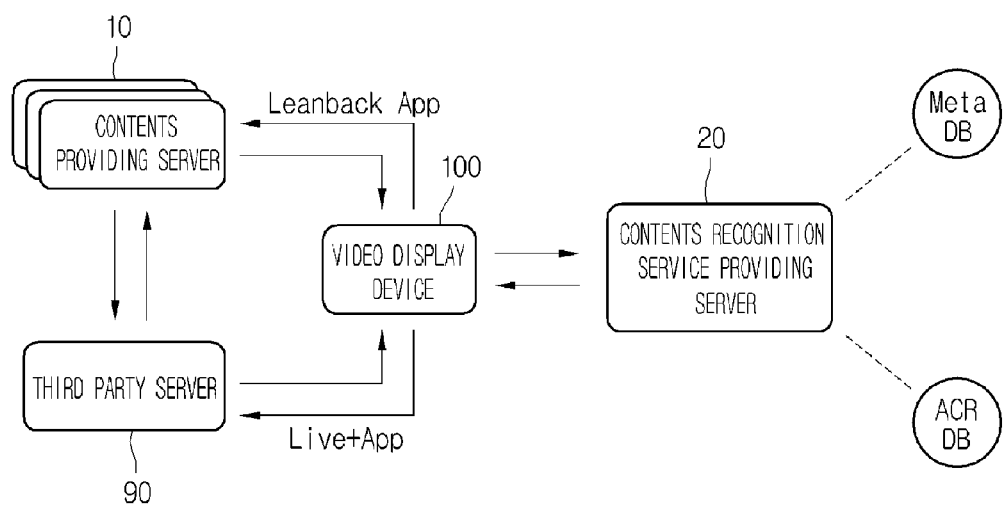
FIG. 17 is a view illustrating a network topology according to an embodiment of the present invention.

FIG. 17 is a view illustrating a network topology according to an embodiment of the present invention.

As shown in FIG. 17, the network topology includes a contents providing server 10 such as a Broadcaster/CP Backend server, a third party server 90 such as the enhanced service providing server 50, a contents recognition service providing server 20 such as an ACR server, and a video display device 100 such as an ACR Smart TV.

The video display device 100 may obtain broadcaster enhanced service from the contents providing server 10 by using a channel-dependent application or a Leanback app such as a contents-dependent application, and may obtain third party enhanced service from the third party server 90 by using a Live+ app such as a channel-in-dependent application.

The Leanback app such as a channel-dependent application is an application that a broadcaster or a CP provides, and also provides a service synchronized by a program unit or a scene unit. Since a broadcaster is a subject to produce a program, it knows well which scene is in a program. Thus, the broadcaster may display the most suitable contents for a specific scene. Once the video display device 100 recognizes a program, it downloads a Leanback app from the contents providing server 10 of the corresponding program, and then, automatically executes the downloaded Leanback app. However, when the video display device 100 changes the current channel to another channel unrelated to the executed Leanback app, it automatically terminates the corresponding Leanback app, and if there is a Leanback app of the changed channel, it executes the corresponding Leanback app.

A Live+ app is an application that a third party provides (for example, a manufacturer), is pre-installed in, a TV, and may be executed always regardless of a channel or program that a user currently watches, unlike the Leanback app. In relation to an ACR architecture that the present invention suggests, a Live+ app displays program related enhanced information and contents synchronized by a scene unit. The Live+ app has a consistent user interface and is always executed regardless of a program. The Live+ app may provide various services by using program related metadata even when a broadcaster does not provide program related additional information. For example, the Live+ app may provide basic information on a program and recommendation on movies in which a program actor appears. Since the Live+ app has an area assigned to a broadcaster/CP, it may display corresponding program related enhancement data on a corresponding area when the broadcaster provides program related additional information. For example, enhancement data that a broadcaster provides may include the replay of the previous broadcast of the program that a user currently watches and scene synchronized contents (for example, product purchase, place reservation, music source purchase and download, and product ad).

The video display device 100 includes an ACR module to extract a signature from uncompressed AV content and queries the contents recognition service providing server 20 through the extracted signature in order to recognize a program. Also, the video display device 100 drives a program related application on the basis of the recognized program. The Leanback app may be downloaded after the program recognition and then executed. The Live+ app may be pre-installed by a manufacturer when a TV is released, or may be downloaded from an app store and installed.

The contents recognition service providing server 20 stores the signatures of audio and/or video of a broadcasted program. The contents recognition service providing server 20 may extract and store the signature of a real-time broadcast by using a signature capture system, and may receive an ACR DB including a signature corresponding to a specific program from a broadcaster and then may store it. The ACR DB of the contents recognition service providing server 20 stores the content ID, signature, timestamp, and URL of a program. In this specification, two types of content IDs may be used.

The first type of content ID, as an ID that a broadcaster directly assigns, is an identifier that uniquely identifies a program in a broadcaster. The broadcaster may assign the content ID to the program in its desired format. The content ID may be used when program related enhancement data are requested to the content providing server 10.

The second type of content ID, as a global unique content ID, is an identifier that uniquely identifies a program nationally or globally. Since programs are transmitted through national broadcast channels, local broadcast channels, cable broadcasts, or satellite broadcasts, in order to extract the signatures of all the programs, a plurality of signature capture equipment may be installed in a plurality of areas. Also, in order to uniquely identify and distinguish each program nationally or globally, a global unique content ID may be assigned to each program. In order to map each program into a global unique content ID, a metadata database may be used. Since the metadata database includes program schedule information in addition to metadata such as program related additional information, the signature delivered from a capture system may be mapped into a certain program by using the metadata database. The capture system knows which area, channel, and time the extracted signature relates to, and thus, when the metadata database is searched with this information, a program may be found. The contents recognition service providing server 20 and the third party server 90 may share the metadata database, and may recognize a program through a global unique content ID by using the metadata database. The format of the global unique content ID may be designated by a third party operating a server, or may be provided from the metadata database.

All services that a Live+ app provides are provided from the third party server 90. The third party server 90 may receive a global unique content ID that the contents recognition service providing server 20 delivers, from the video display device 100. The third party server 90 may extract program related metadata corresponding to the global unique content ID from the metadata database through the global unique content ID, and on the basis of the extracted metadata, may provide program related various services to the video display device 100. Additionally, if there is additional information on the recognized program that a broadcaster provides, the third party server 90 accesses the broadcaster server in order to receive program related enhancement data, and processes and provides them to the video display device 100. The program related enhancement data that a broadcaster provides through a Live+ app have the same contents as but a different user interface from the enhancement data that a Leanback app. However, in another embodiment, according to broadcasters, the program related enhancement data that a broadcaster provides through a Live+ app may be different from those that a Leanback app provides.

There may be a plurality of contents providing servers 10 for a plurality of broadcasters or a plurality of CPs. The contents providing server 10 has a program targeted Leanback app and program related enhancement data that the Leanback app outputs.

Figure 18:
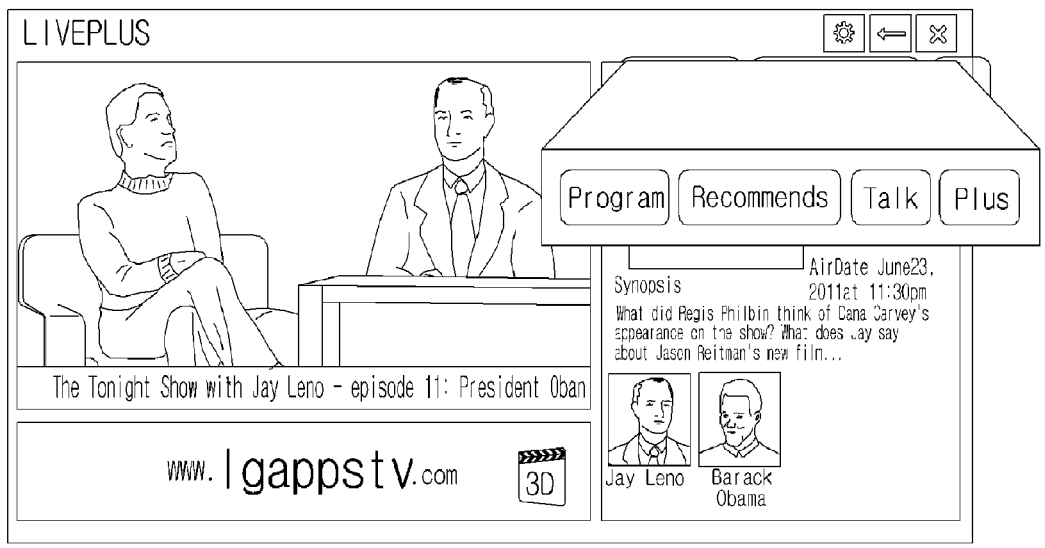
FIG. 18 is a view, illustrating a Live+ app according to various embodiments of the present invention.

FIG. 18 is a view illustrating a Live+ app according to various embodiments of the present invention.

The Live+ app may resize main AV media content in order to display it on the upper left area of the screen, may display program related additional information on the right area of the screen, and may display a program related ad on the bottom area of the screen. The Live+ app may display a plurality of tabs on the top area of the contents area in the right area. The plurality of tabs may include a program tab, a recommends tab, a talk tab, and a plus tap.

Figure 19:
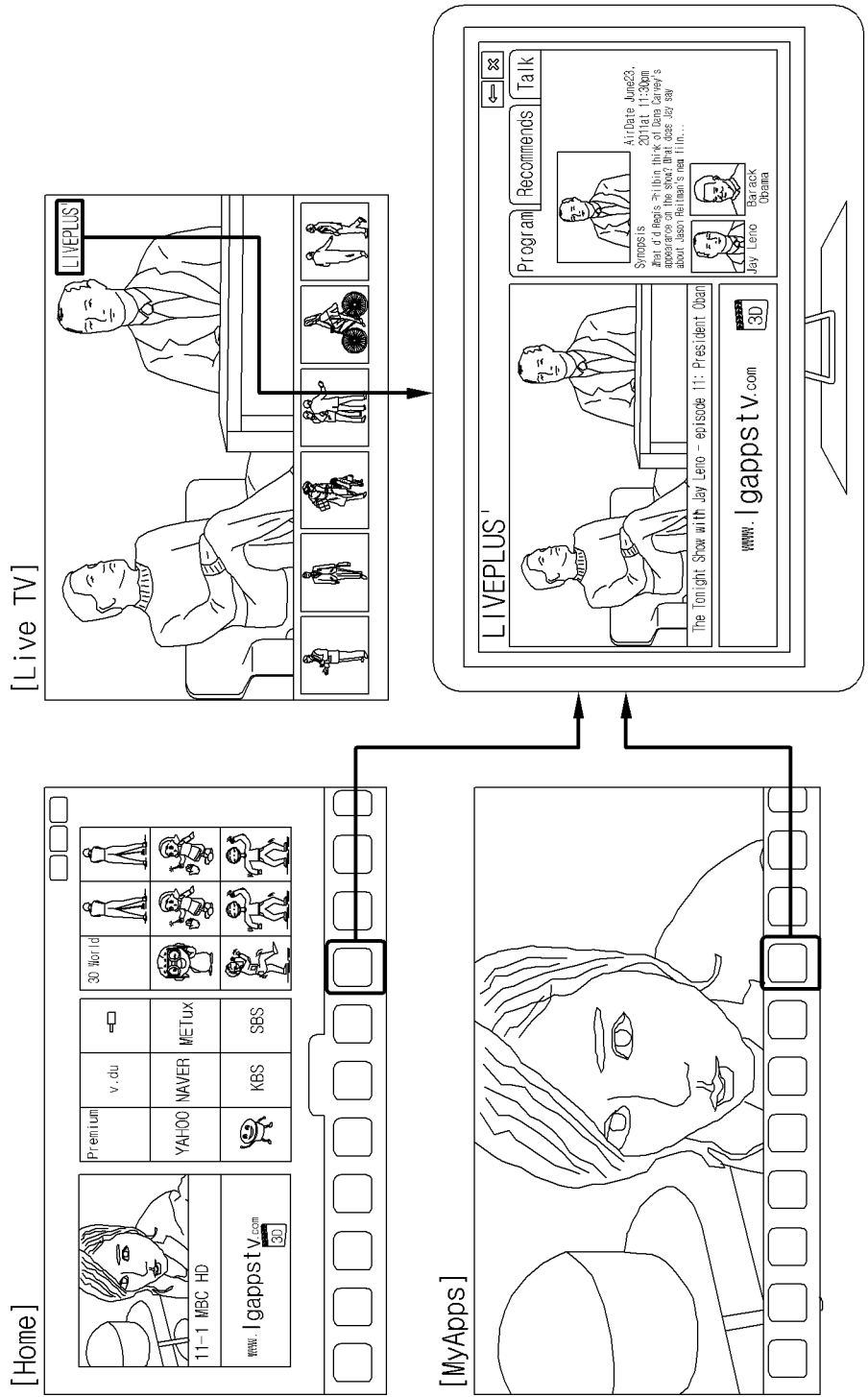
FIG. 19 is a view illustrating a method of executing a Live+ app according to various embodiments of the present invention.

FIG. 19 is a view illustrating a method of executing a Live+ app according to various embodiments of the present invention.

The video display device 100 may display a home screen or a My Apps screen. The My Apps screen is a screen displaying a list of application installed in the video display device 100.

On receiving a user input selecting a Live+ app from a plurality of applications shown on the home screen or the My Apps screen, the video display device 100 may execute the Live+ app.

Additionally, while playing a broadcast, the video display device 100 may display a graphic notifying that there is a Live+ app at a predetermined time interval through a timer, and when receiving a user input relating to this graphic, may execute the Live+ app.

Figure 20:
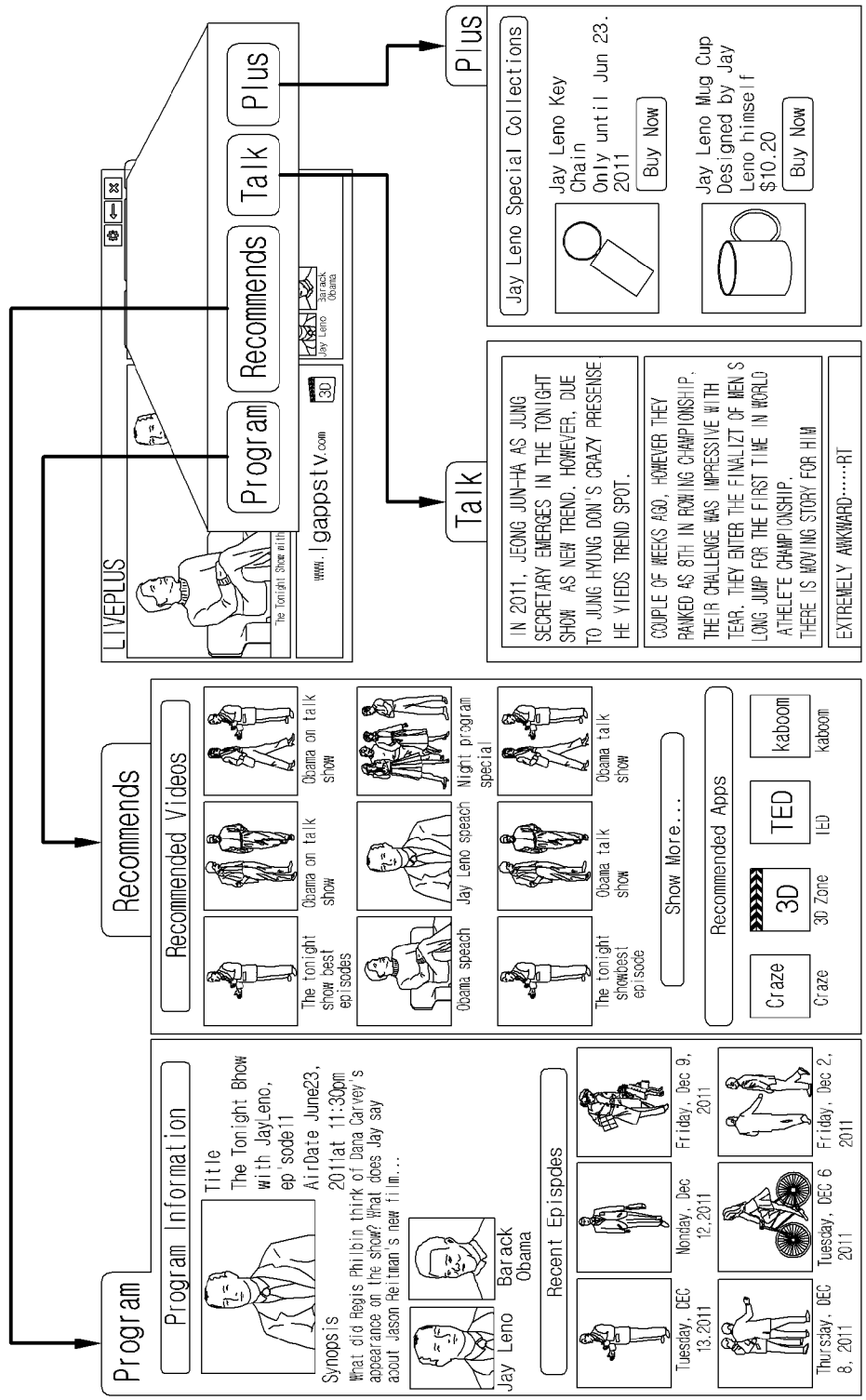
FIG. 20 is a view illustrating a tab function of a Live+ app according to an embodiment of the present invention.

FIG. 20 is a view illustrating a tab function of a Live+ app according to an embodiment of the present invention.

The program tab provides basic information on a program that a viewer currently watches and the replay service of the program. The video display device 100 may fetch the program basic information from the Meta DB of the third party server 90. The video display device 100 may bring the information on the program replay service from the contents providing server 10 that creates a corresponding program, through the third party server 90.

The recommends tab may recommend another AV content relating to a current program, i.e. a movie or a video (for example, Youtube) or an app relating to the current program. The third party server 90 may determine a movie or a video for recommendation on the basis of the title, genre, or cast of the current program, and then may process the information about this to provide the recommendation tab of the Live+ app of the video display device 100.

The Talk tab provides a twitter article corresponding to the current program related conversation content. The third party server 90 may searches for the current program related twitter article on the basis of the title, genre, or cast of the current program, and then may process the searched article to provide the Talk tab of the Live+ app of the video display device 100.

The Plus tab is an area where a broadcaster displays the program related data. The Plug tab may provide information received from the broadcaster as it is, or may provide: information that is received from a broadcaster server and processed by the third party server 90. There is no limit to the type and number of data that the Plus tab provides. The Plus tab may provide various enhancement data such as product purchase, place reservation, music source purchase, and product ad. However, when the information from a broadcaster server is provided to the Plus tab as it is, the third party server 90 processes the information from the broadcaster server to be fit for the position and size of the contents area of the Live+ app, and then provides the processed information to the video display device 100

Figure 21:
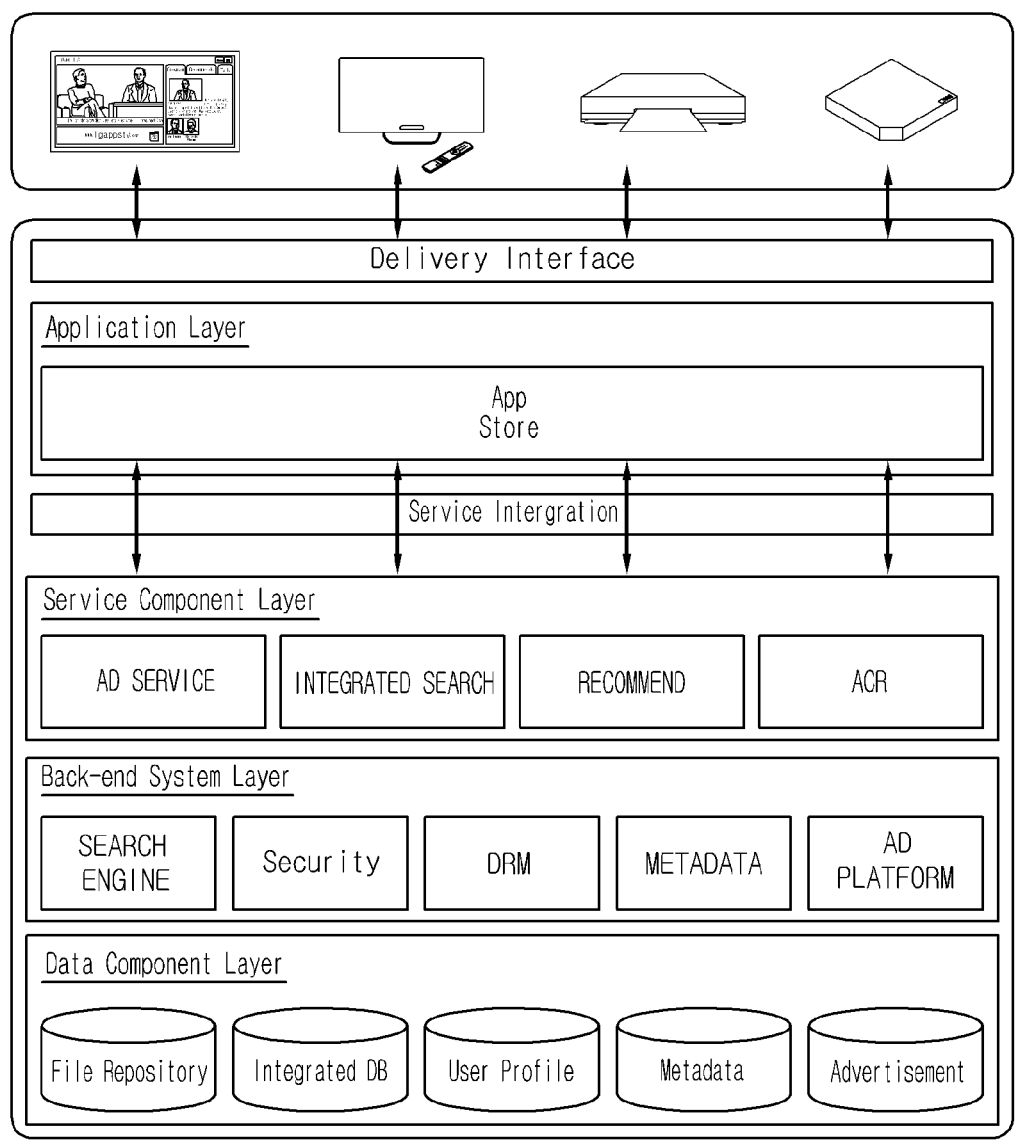
FIG. 21 is a view illustrating an architecture of the third party server 90 according to an embodiment of the present invention.

FIG. 21 is a view illustrating an architecture of the third party server 90 according to an embodiment of the present invention.

As shown in FIG. 21, the third party server 90 includes an Application Layer, a Service Component Layer, a Back-end System Layer, and a Data Component Layer.

The application layer may communicate with various devices including the video display device 100 through a delivery interface. The application layer may include an AppStore component. The AppStore component may support an interface through which a developer registers an app, and also may support an interface through which a general user searches for, downloads, and installs an app. Additionally, the Live+ app may receive services such as ad, search, and recommendation in the third part server 90 through the AppStore component.

A service component layer may communicate with the application layer through a service integration interface. The service component layer includes an ad service component, an integration search component, a recommendation component, and an ACR component. The service component layer receives the processed data from the back-end system layer and delivers them to the application layer. The ACR component may obtain program related basic additional information through the metadata component of the back-end system layer by using the received Content ID, Global Content ID, timestamp, and broadcaster server URL from the video display device 100. Additionally, the ACR component may deliver the information on a program title and actors obtained from the metadata to the integration search component in order to a program related search result.

The back-end system layer reads original data from the data component layer and processes and delivers the data to the service component layer. The back-end system layer may include a search engine security component, a DRAM component, a metadata component, an ad platform component, and an ACR component.

The data component layer may have actual data. Here, the data component layer may include a file repository, an integrated DB, a user profile repository, a user profile repository, a metadata repository, and an ad data storage. The user profile repository may store information on a viewer or user's gender, age, region, income, family member, preferred genre, preferred channel, and preferred program. The metadata repository may include information on content's title, episode, director, synopsis, casts, genre; channel, and air time. The third party server 90 may receive information on a content from a metadata provider or real-time broadcast guide information (for example, in the case of ATSC terrestrial waves, PSIP), and then may store the received information in the metadata repository.

Figure 22:
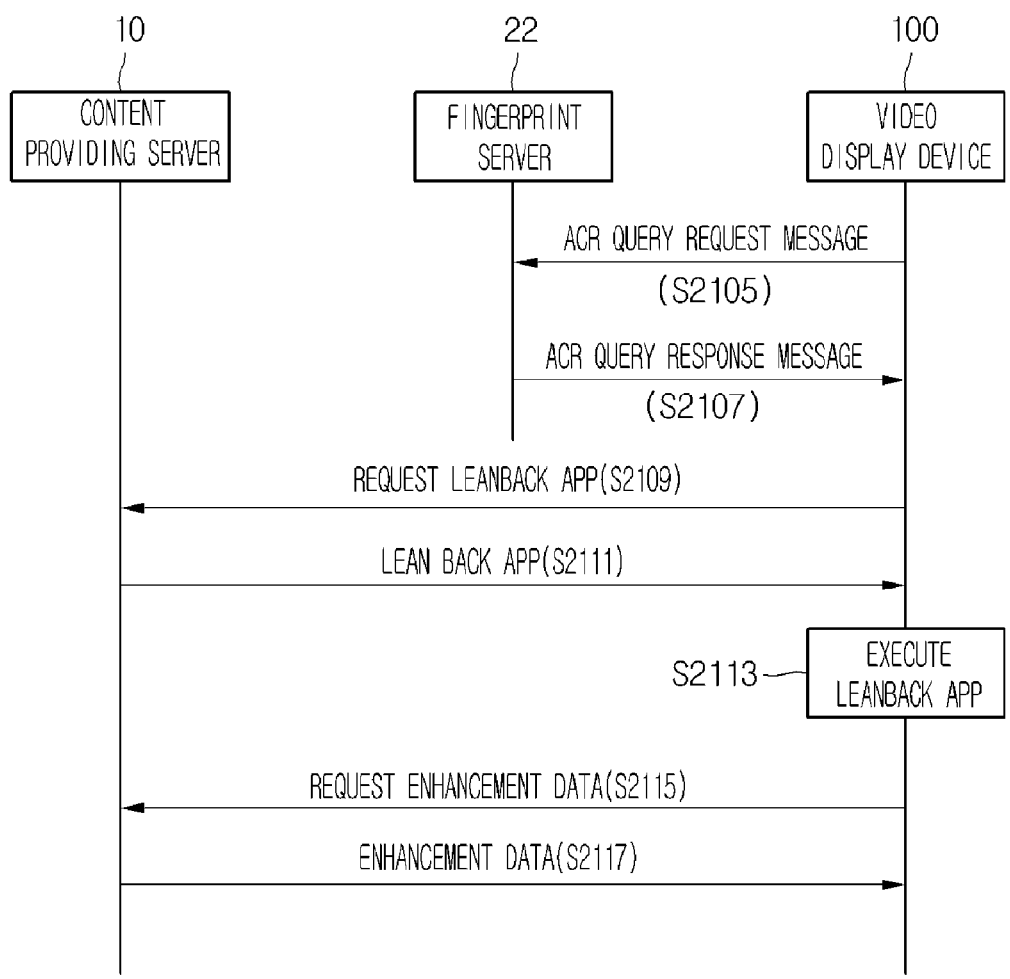
FIG. 22 is a ladder diagram illustrating an operation of a video display device for an automatic execution application according to an embodiment of the present invention.

FIG. 22 is a ladder diagram illustrating an operation of a video display device for an automatic execution application according to an embodiment of the present invention.

First, the video display device 100 extracts feature information from some frames of the main AV content or a section of audio samples of the main AV content, and transmits an ACR query request message including the extracted feature information to a fingerprint server 22 corresponding to an ACR server in operation S2105.

The fingerprint server 22 queries feature information in the ACR query request message from an ACR DB to identify a program corresponding to the feature information, and provides an ACR query response message including contents information on the identified program to the video display device 100 in operation S2107. At this point, the ACR query response message may include information on whether program recognition is successful, contents information, and the URL of a Leanback app. As mentioned above, the content information may include the content ID and timestamp of the recognized program. Here, the format of the content ID may be a format that only a corresponding broadcaster recognizes. Especially, this is the case that a broadcaster provides the ACR DB of the corresponding program to the contents recognition service providing server 20.

When the program identification is successful and the Leanback app URL is valid, the video display device 100 requests a Leanback app through a corresponding Leanback app URL in operation S2109.

The contents providing server 10 provides the Leanback app that the video display device 100 requests to the video display device 100 in operation S2111. Consequently, the video display device 100 may download the Leanback app.

When the video display device 100 successfully downloads the Leanback app, it automatically executes a corresponding, Leanback app in operation S2113.

The Leanback app executed in the video display device 100 obtains a content ID and a timestamp periodically from an ACR engine in the video display device 100, and transmits an enhancement data request message including the obtained content ID and timestamp to the contents providing server 10 in operation S2115, and then requests the enhancement data relating to a scene corresponding to the content ID and the timestamp.

The contents providing server 10 delivers the requested enhancement data to the Leanback app. Since the Leanback app is an application that a broadcaster provides, an interface of the contents providing server 10 of one broadcaster may be different from that of the contents providing server 10 of another broadcaster. When there is scene related additional information, the Leanback app may perform operations S2113 and S2117 repeatedly.

Figure 23:
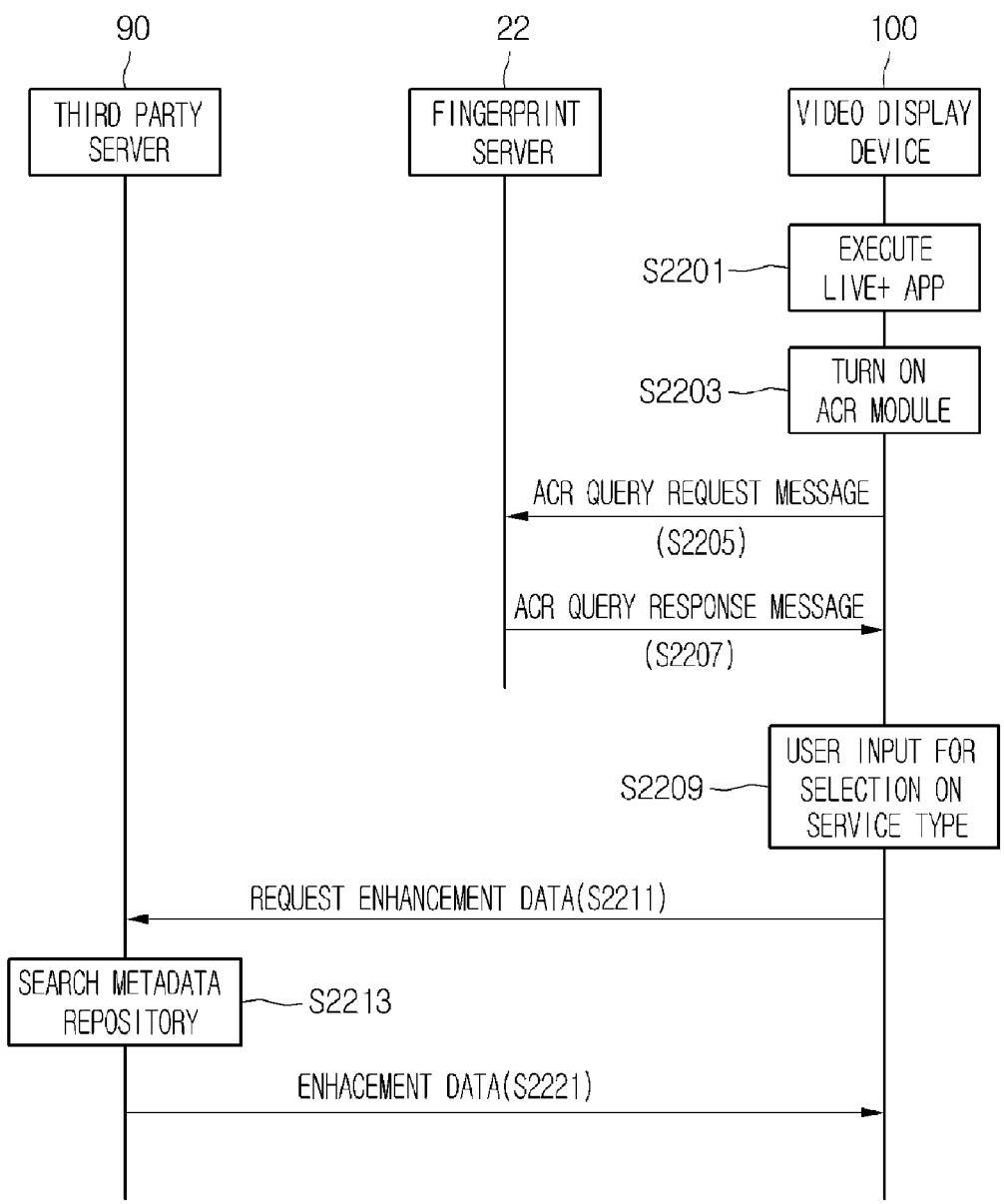
FIG. 23 is a ladder diagram illustrating an operation of a video display device for a channel-independent application according to an embodiment of the present invention.

FIG. 23 is a ladder diagram illustrating an operation of a video display device for a channel-independent application according to an embodiment of the present invention.

On receiving a user input to execute an installed Live+ app, the video display device 100 executes the Live+ app in operation S2201.

When an ACR function is turned off, the Live+ app executed in the video display device 100 turns on the ACR module in operation S2203.

The video display device 100 extracts feature information from some frames of the main AV content or a section of audio samples of the main AV content, and transmits an ACR query request message including the extracted feature information to the ACR server corresponding to the fingerprint server 22 in operation S2205.

The fingerprint server 22 queries feature information in the ACR query request message from an ACR DB to identify a program corresponding to the feature information, and provides an ACR query response message including contents information on the identified program to the video display device 100 in operation S2207. At this point; the ACR query response message may include information on whether program recognition is successful and contents information. As mentioned above, the content information may include the global unique content ID and timestamp of the recognized program.

The Live+ app executed in the video display device 100 receives a user input for service type selection in operation S2209. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2211 in order to request enhancement data corresponding to the selected service type. At this point, the program related content request message may include content information on the currently recognized program and information on the selected service type.

The Live+ app may transmit an HTTP based request to the third party server 90 through ajax call. Parameters delivered at this point may include a service type, a Content ID, a Global Content ID, a timestamp, and a broadcaster server URL. The HTTP request may deliver a HTTP GET based parameter using the following syntax.

```
[HTTP GET syntax]
?service=<service name>&contentId=<Content ID>
&globalContentId=<Global Content ID>&ts=<timestamp>
[&url=< broadcaster server URL>]
```

<service name> is the name of a service that a Live+ app requests. In this embodiment, the following <service name> may be used.

"getProgram": is a service name for receiving program related basic information and previous episodes, and is used for a program tab of a Live+ app.

"getRecommends": is a service name for receiving data of program related recommendation (VOD recommendation and App recommendation), and is used for a recommends tab of a Live+ app.

"getTalk": is a service name for receiving program related article/twitter, and is used for a talk tab of a Live+ app.

"getPlus": is a service name for receiving program related enhancement data that a broadcaster provides, and is used for a plus tab of a Live+ app.

<Content ID> is a value that a broadcaster delivers to the contents recognition service providing server 20, and is a content ID that is internally used by a broadcaster in order to uniquely identify a program.

<Global Content ID> is used for uniquely and globally identifying a program, and for this, the contents recognition service providing server 20 and the third party server 90 may need to use the same Meta DB. The Global Content ID may follow the content id format of the Meta DB.

<timestamp> notifies the current watching time of the recognized program and is a value delivered from the contents recognition service providing server 20.

<broadcaster server URL> is delivered when a broadcaster provides program related enhancement data, and with this value, the third party server 90 may access a broadcaster server.

In order to locate enhancement data of a program corresponding to the delivered Global Content ID, the third party server 90 searches the metadata repository in operation S2213. The metadata repository returns a search result on the enhancement data of a program corresponding to the delivered Global Content ID, to the third party server 90.

The third party server 90 processes the received program enhancement data from the metadata repository and provides the processed enhancement data to the Live+ app executed in the video display device 100 in operation S2221. The third party server 90 may transmit the processed enhancement data in an HTTP based response through ajax call.

Figure 24:
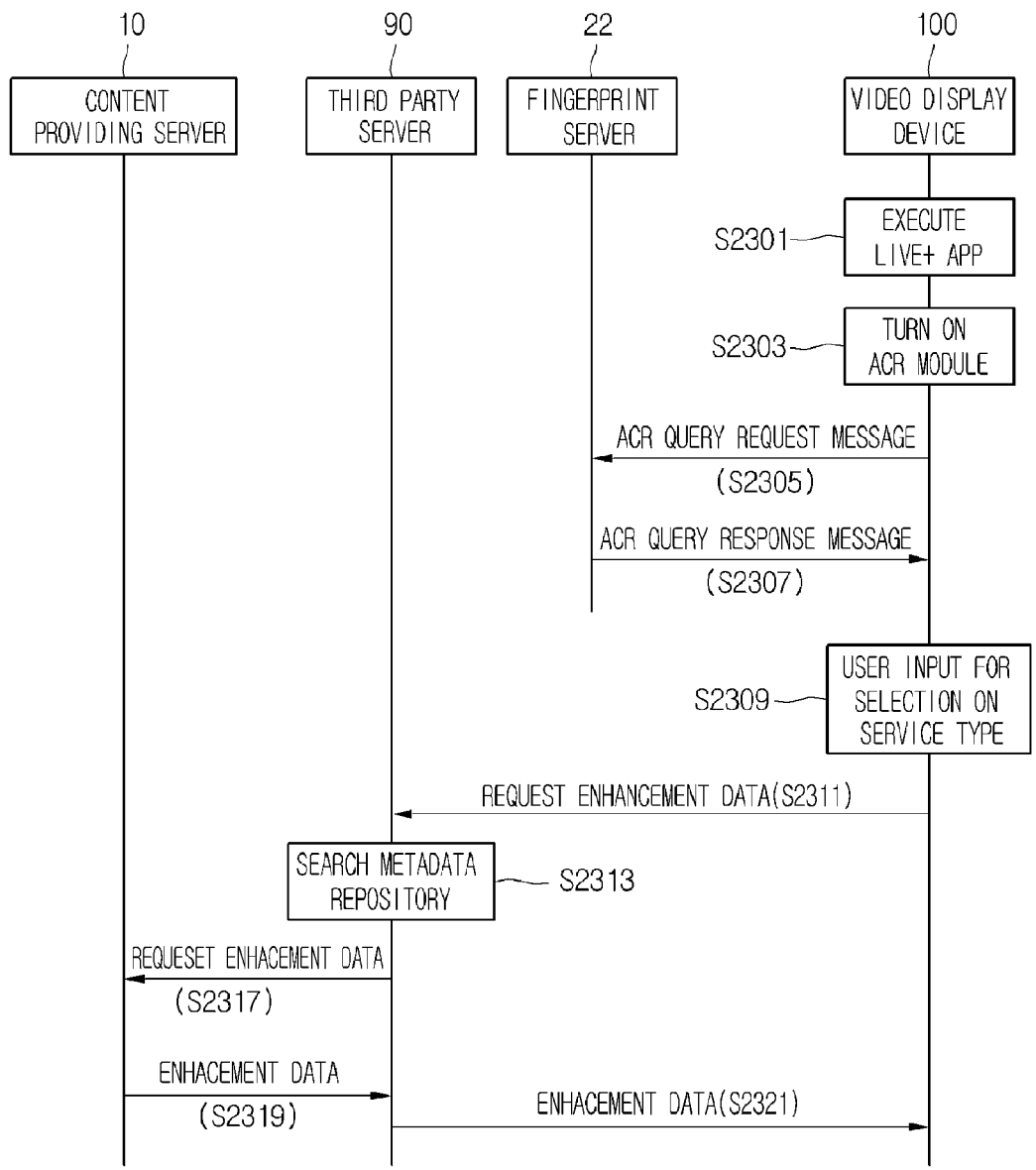
FIG. 24 is a ladder diagram illustrating an operation of a video display device for a channel-independent application according to another embodiment of the present invention.

FIG. 24 is a ladder diagram illustrating an operation of a video display device for a channel-independent application according to another embodiment of the present invention.

On receiving a user input to execute an installed Live+ app, the video display device 100 executes the Live+ app in operation S2301.

When an ACR function is turned off, the Live+ app executed in the video display device 100 turns on the ACR module in operation S2203.

The ACR engine of the video display device 100 extracts feature information from some frames of the main AV content or a section of audio samples of the main AV content, and transmits an ACR query request message including the extracted feature information to the ACR server corresponding to the fingerprint server 22 in operation S2305.

The fingerprint server 22 queries feature information in the ACR query request message from an ACR DB to identify a program corresponding to the feature information, and provides an ACR query response message including contents information on the identified program to the ACR engine of the video display device 100 in operation S2307. At this point, the ACR query response message may include information on whether program recognition is successful, contents information, and the URL of the contents providing server 10. As mentioned above, the content information may include the global unique content ID of the recognized program and the content ID and timestamp that the broadcaster of the recognized program identifies. In another embodiment, the video display device 100 may have the URL of the contents providing server 10 in advance, not obtaining the URL from the ACR query response message.

The Live+ app executed in the video display device 100 receives a user input for service type selection in operation S2309. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2311 in order to request enhancement data corresponding to the selected service type. At this point, the program related content request message may include content information on the currently recognized program, information on the selected service type, and the URL of the broadcaster contents providing server 10.

In order to locate enhancement data of a program corresponding to the delivered Global Content ID, the third party server 90 searches the metadata repository in operation S2313. The metadata repository returns a search result on the enhancement data of a program corresponding to the delivered Global Content ID, to the third party server 90.

The third party server 90 accesses the delivered URL of the broadcaster contents providing server 10, and transmits a metadata request message including the delivered broadcaster content ID and timestamp to the contents providing server 10 in operation 2317 in order to request the current scene related enhancement data to the contents providing server 10.

The third party server 90 receives the current scene related enhancement data from the contents providing server 10 in operation S2319.

The third party server 90 processes one or a combination of the received program enhancement data from the metadata repository and the received program enhancement data from the contents providing server 10 and provides the processed enhancement data to the Live+ app executed in the video display device 100 in operation S2321.

Figure 25:
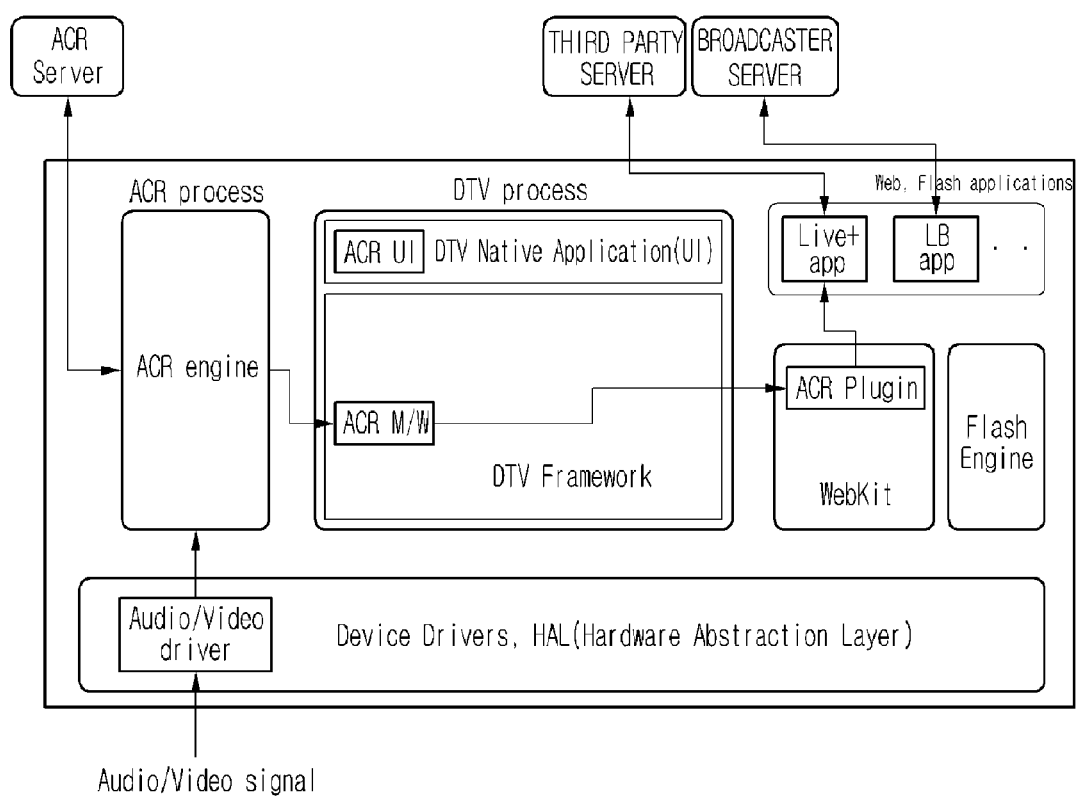
FIG. 25 is a conceptual diagram illustrating a video display device according to an embodiment of the present invention.

FIG. 25 is a conceptual diagram illustrating a video display device according to an embodiment of the present invention.

As shown in FIG. 25, the video display device 100 includes an AudioNideo driver 601, an ACR engine 603, an ACR middleware 605, an ACR user interface 607, and an ACR Plugin 609.

The audio/video driver 601 captures an audio/vide signal from an external input of a TV and delivers it to the ACR engine 603. The audio/video driver 601 may provide API to allow the ACR engine 603 to access an audio/video buffer. The audio/video driver 601 may also provide characteristic information on audio/video inputted from an external input such as HDMI. For example, the audio/video driver 601 may provide information such as a sample depth, a sampling rate, the number of channels. (mono/stereo 등), the number of samples, and a sample time, in the case of audio. In the case of video, the audio/video driver 601 may provide information such as a video format, and the width, height, stride, stream time, input type (HDMI1, HDMI2, composite, component, etc), and the number of frames per second of video.

The ACR engine 603 may be executed as an additional process, and may recognize a program by using the above mentioned various methods. The ACR engine 603 extracts a signature from an audio/video sample, and delivers the extracted signature to the ACR server to recognize content. As described above, the ACR engine 603 may call APT to access an audio/video buffer depending on the implementation of a platform, and may deliver the audio/video stream captured by the audio/video driver 601 to an ACR process through a method such as a socket ACR engine 603 sends an ACR query request in addition to the signature to the ACR server, and receives an ACR query response including whether the content recognition is successful, a Content ID, a Global Content ID, a timestamp, a Leanback app URL, and a broadcaster server URL, from the ACR server. The ACR engine 603 may deliver the result from the ACR server to the ACR middleware 605.

The ACR middleware 605 is a module corresponding to the middleware of a DTV process, and processes an ACR control and an ACR query response from the ACR engine 603. The ACR middleware 605 controls ACR by executing or terminating an ACR process or starting or stopping the ACR engine 603. Additionally, the ACR middleware 605 stores values such as a Content ID, a Global Content ID, and a timestamp by parsing the ACR query response. The ACR middleware 605 may provide API to transmit the stored value to an ACR UI or may transmit the stored value to the ACR user interface 607 through a message queue and a global variable. Additionally, in order to deliver data such as a Content ID, a Global Content ID, and a timestamp to an ACR application such as a Live+ app or a Leanback app, the ACR middleware 605 may deliver the data to a web browser through Inter-Process Communication (IPC) of a shared memory and socket.

The ACR user interface 607 may display a UI to a user for ACR control of ACR On/Off, or may display information on the name and time of a recognized program to a user through a status bar UI of a TV.

When the ACR middleware 605 delivers data such as a Content ID, a Global Content ID, and a timestamp, which are to be delivered to an ACR application, to a browser, the ACR plugin 609 receives the data. The ACR plugin 609 may deliver a corresponding value to an ACR application through a Plugin Object Interface. An interface of the ACR plugin 609 according to an embodiment is shown below.

|  | Name |
| --- | --- |
| Property | Readonly ACRMetadata metadata |
|  | Readonly String backendURL |
| Method | backendURL getACRMetadata( ) |
|  | String getBackendURL( ) |
|  | Void NotifyACRAppLaunched(Boolean bApp, String url, String desc) |
|  | Void SetAppinfo(String state, String url) |
| Event | function onContentChanged(String contentid) |
|  | function onMediaTimeUpdated(Number mediaTime) |
|  | function onAppShow(String state) |
|  | function onAppHide( ) |

As mentioned above, the metadata provide basic metadata on a recognized program.

backendURL represents the URL of a broadcaster/CP server.

getACRMetadata( ) is a function for obtaining basic metadata on a recognized program and returns the same value as metadata Property.

getBackendURL( ) is a function for returning the URL of a broadcaster/CP server.

NotifyACRAppLaunched( ) is a function for notifying an application of a 2nd screen when the 2nd screen such as a mobile terminal and a TV are paired and an ACR application executes a specific URL or app on a TV.

SetAppInfo( ) is a function for notifying the current state of an ACR application and the app URL of a 2nd screen version of a corresponding application.

onContentChanged( ) is a callback function called when a recognized program is changed.

onMediaTimeUpdated( ) is a callback function called each time a timestamp is changed through ACR.

onAppShow( ) is a callback function called when an application in a 2nd screen moves to a TV, with the TV and 2nd screen paired.

onAppHide( ) is a callback function called when an application in a TV moves to a 2nd screen, with the TV and 2nd screen paired.

Next, a usage information reporting method will be described according to an embodiment with reference to FIGS. 26 and 34.

The video display device 100 may include an operation for registering itself to a usage information measuring server to report usage information, an operation for obtaining usage information, and an operation for reporting and using usage information.

Figure 26:
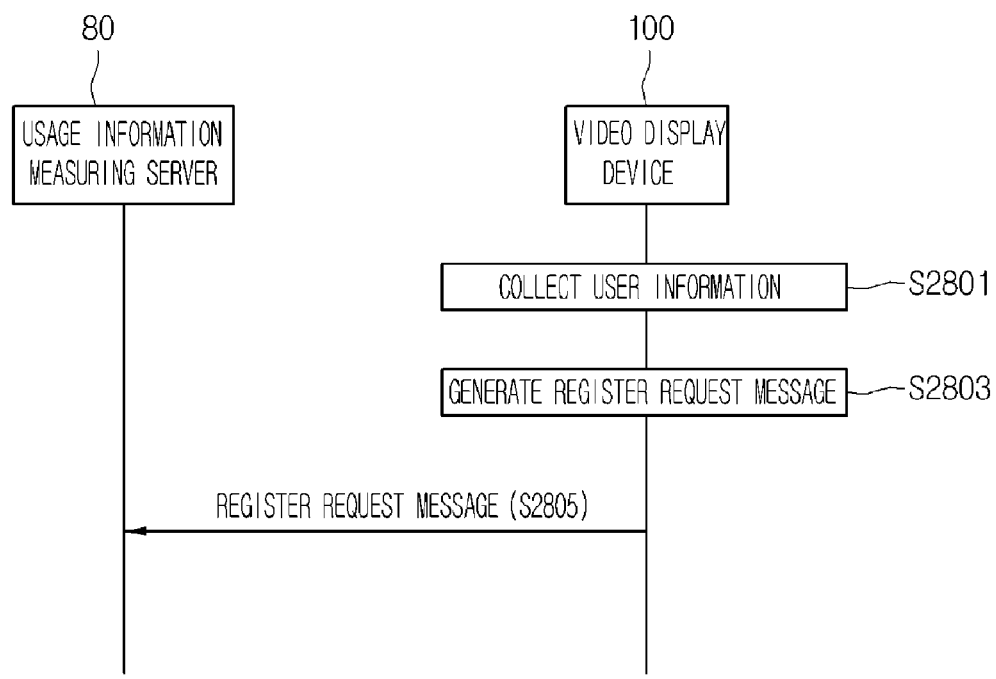
FIG. 26 is flowchart illustrating a method of registering to a usage information measuring server according to an embodiment.

FIG. 26 is flowchart illustrating a method of registering to a usage information measuring server according to an embodiment.

As shown in FIG. 26, the video display device 100 communicates with the usage information measuring server 80. The usage information measuring server 80 may be one module in the content providing server 10, the content recognizing service providing server 20, the multi channel video distributing server 30, the enhanced service information providing server 40, the plurality of enhanced service providing servers 50, the broadcast receiving device 60, or the video display device 100, or may be an additional server inside or outside a home.

First, the video display device 100 collects user information in operation S2801. The video display device 100 receives and collects account information, family member information, preferred genre information, and usage information range from a user, and then, stores the collected user information in the user information storage unit 156. The video display device 100 may collect video display device information from the user information storage unit 156.

Then, the video display device 100 generates a registration request message including the collected user information in operation S2803. The registration request message may include an XML type document as shown in FIG. 27.

Figure 27:
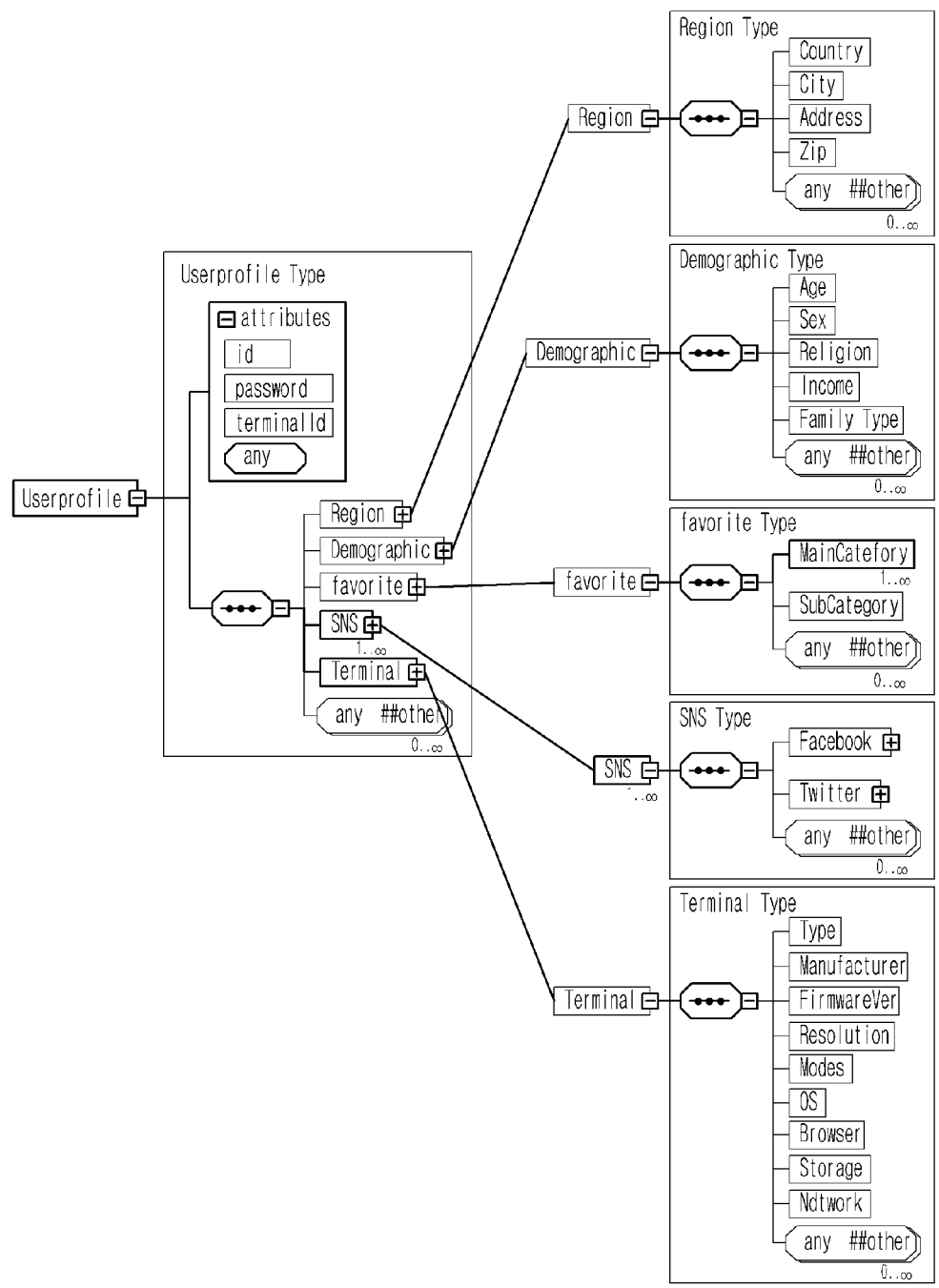
FIG. 27 is a view illustrating an XML schema of user information according to an embodiment.

FIG. 27 is a view illustrating an XML schema of user information according to an embodiment.

As shown in FIG. 27, a UserProfile element containing user information has id, password, and terminalID attributes and Region, Demographic, Favorite, SNS, and Terminal elements.

The id and password attributes include account information for the usage information measuring server 80. The terminalID attribute includes an identifier of the video display device 100.

The Region element includes Country, City, Address, and Zip elements. The Country element includes country information; the City element includes city information; the Address element includes address information; and the Zip element includes zip code. Information in the Region element allows different advertisement and product introduction according to a region.

The Demographic element includes Age, Sex, Religion, Income, and Family Type elements. The Age element includes age information; the Sex element includes sex information; and the Religion element includes religion information. The Income element includes household income information, and the Family Type element includes family member type information. Information in the Demographic element allows customized service according to a family member type.

The Favorite element includes MainCategory and SubCategory elements. The Main-Category element includes a main preferred genre, and the SubCategory element includes a sub preferred genre.

The SNS element includes Facebook and Twitter elements. The Facebook element includes Facebook account information, and the Twitter element includes Twitter account information.

The Terminal element includes Type, Manufacturer, FirmwareVer, Resolution, Model, OS, Browser, Storage, and Network elements. The type element includes video display device type information; the Manufacturer element includes video display manufacturer information; and the FirmwareVer element includes firmware version information of a video display device. The Resolution element includes resolution information and a video display device; the Model element includes model information of a video display device; and the OS element includes OS information of a video display device. The Browser element includes browser information and a video display device; the Storage element includes storage information of a video display device; and the Network element includes network information of a video display device.

Moreover, the registration request message may further include a usage information range. The usage information range may be set in each virtual channel. Additionally, the usage information range may be set over an entire physical channel.

The video display device 100 transmits the generated registration request message to the usage information measuring server 80 to request a registration in operation S2805.

Figure 28:
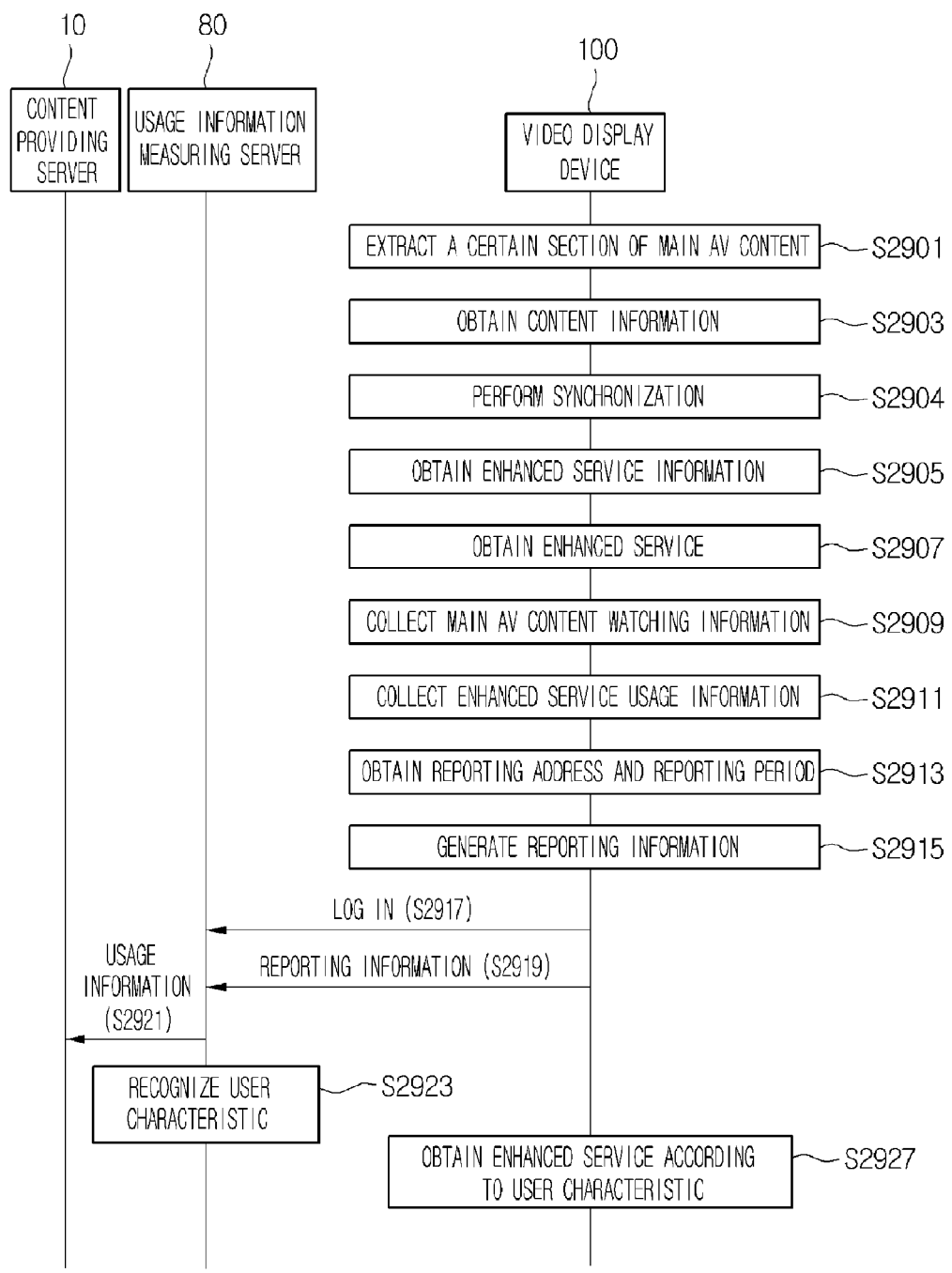
FIG. 28 is flowchart illustrating a method of obtaining, reporting, and using usage information according to an embodiment.

FIG. 28 is flowchart illustrating a method of obtaining, reporting, and using usage information according to an embodiment.

First, the enhanced service management unit 130 extracts a certain section of a main AV content in operation S2901.

The enhanced service management unit 130 obtains, content information of the main AV content on the basis of the extracted section in operation S2903. In more detail, the enhanced service management unit 130 decodes information encoded with invisible watermark in the extracted section to obtain content information. Additionally, the enhanced service management unit 130 may extract feature information in the extracted section, and obtain the content information of the main AV content from the fingerprint server 22 or the content information storage unit 151 on the basis of the extracted feature information.

The enhanced service management unit 130 synchronizes the playback time of the main AV content with the start time of enhanced service information in operation S2904.

Then, the enhanced service management unit 130 obtains the enhanced service information on the basis of the obtained content information in operation S2905.

The enhanced service management unit 130 obtains an enhanced service on the basis of the obtained content information in operation S2907.

The enhanced service management unit 130 collects main AV content watching information in a usage information range on the basis of continuously obtained content information in operation S2909, and stores the collected main AV content watching information in the usage information storage unit 157. The main AV content watching information may include a main AV content identifier and main AV watching time information. The main AV content watching time information may include the watching start time of and watching end time of the main AV content.

The enhanced service management unit 130 collects enhanced service usage information in a usage information range on the basis of a user input corresponding to the execution, manipulation, and ending of the obtained enhanced service in operation S2911, and stores the collected enhanced service usage information in the usage information storage unit 157. The enhanced service usage information may include an enhanced service identifier and enhanced service usage time information. The enhanced service usage time information may include the usage start time and usage end time of the enhanced service.

The enhanced service management unit 130 obtains the address and reporting period of the usage information measuring server 80 in operation S2913. The address and reporting period of the usage information measuring server 80 may be predetermined. The enhanced service management unit 130 obtains the address and reporting period of the usage information measuring server 80 from the content information or enhanced service information.

In the other hand, the enhanced service management unit 130 obtains content information and enhanced service information on the basis of the extracted main AV content section, and obtains ATSC 2.0 metadata from the obtained information. The enhanced service management unit 130 extracts a usage reporting location table such as Table 3 or Table 4 from a service signaling channel of an ATSC 2.0 metadata service, and obtains a reporting address and reporting period from the table. The usage reporting location table may have a low signaling period such as a 1 min period, and this may reduce bandwidth usage.

TABLE 3

| Syntax | No. Bits | Format |
|---|---|---|
| usage_reporting_location_table_section( ) { | | |
|   table_id | 8 | 0xTBD |
|   section_syntax_indicator | 1 | '0' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   num_usage_reporting_location_in_section | 8 | uimsbf |
|   URL_count | 5 | uimsbf |
|   for (i=0; i<URL_count; i++) { | | uimsbf |
|     type_of_URL | 3 | uimsbf |
|     reserved | 5 | uimsbf |
|     URL_length | 8 | uimsbf |
|     URL( ) | var | uimsbf |
|     reporting_interval | 5 | uimsbf |
|   } | | |
| } | | |

As shown in Table 3, the usage reporting location table may signal a plurality of reporting addresses and reporting periods. The plurality of reporting periods correspond to the plurality of reporting addresses, respectively.

TABLE 4

| Syntax | No. Bits | Format |
|---|---|---|
| usage_reporting_location_table_section( ) { | | |
|   table_id | 8 | 0xTBD |
|   section_syntax_indicator | 1 | '0' |
|   private_indicator | 1 | '1' |
|   reserved | 2 | '11' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   num_usage_reporting_location_in_section | 8 | uimsbf |
|   reporting_interval | 5 | uimsbf |
|   URL_count | 5 | uimsbf |
|   for (i=0; i<URL_count; i++ ) { | | uimsbf |
|     type_of_URL | 3 | uimsbf |
|     reserved | 5 | uimsbf |
|     URL_length | 8 | uimsbf |
|     URL( ) | var | uimsbf |
|   } | | |
| } | | |

As shown in Table 4, the usage reporting location table may signal a plurality of reporting addresses and one common reporting period.

The enhanced service management unit 130 generates reporting information including at least one main AV content watching information item and at least one enhanced service usage information item in operation S2915.

Examples of a main AV content watching information item and an enhanced service usage information item will be described with reference to FIGS. 29 and 30.

Figure 29:
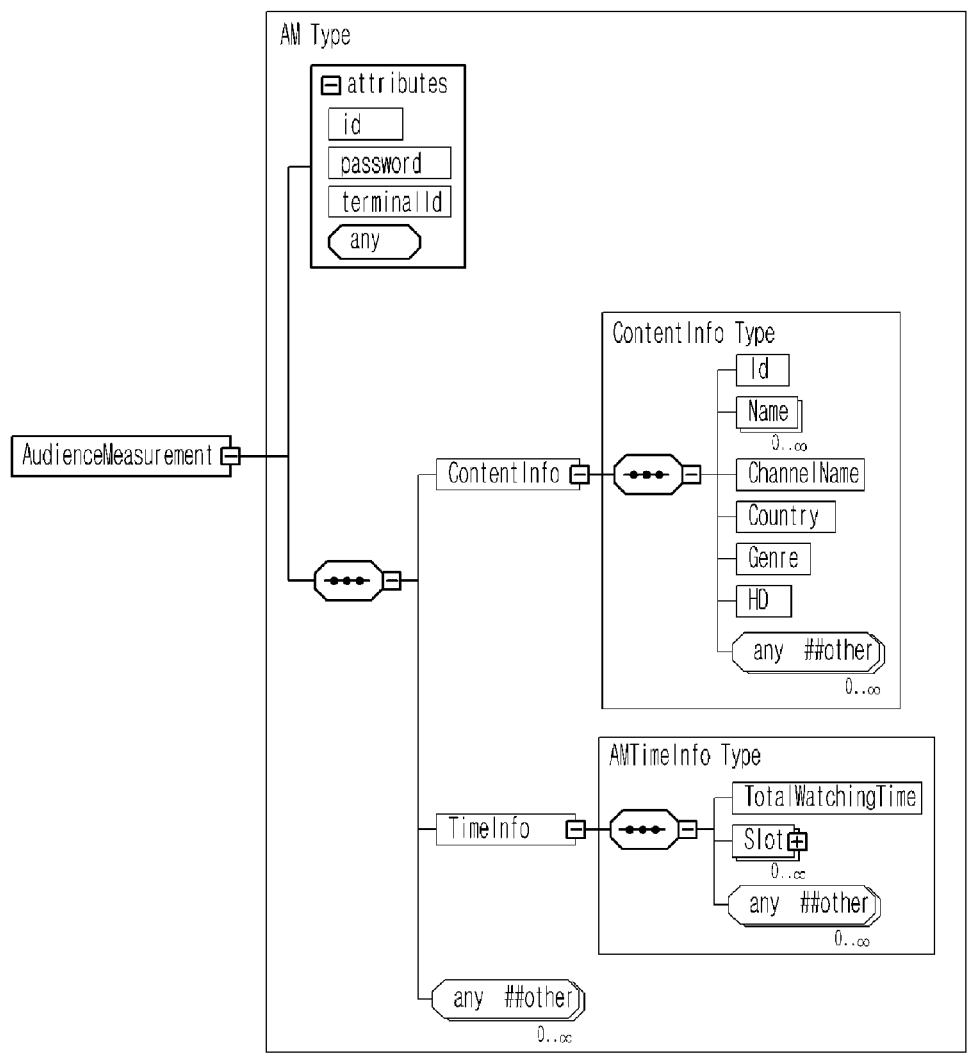
FIG. 29 is an XML schema of a main AV content watching information item according to an embodiment.

FIG. 29 is an XML schema of a main AV content watching information item according to an embodiment.

As shown in FIG. 29, an AudienceMeasurement element corresponding to the main AV content watching information item includes an id attribute, a password attribute, and a terminalID attribute, and a ContentInfo element and a TimeInfo element.

The id and password attributes include account information for the usage information measuring server 80. The terminalID attribute includes an identifier of the video display device 100.

The ContentInfo element includes an Id element, a Name element, a ChallelName element, a Country element, a Genre element, and an HD element.

The ID element includes a main AV content identifier. Especially, as the main AV content identifier, the Id element may include a transport stream identifier Transport Stream ID, a source identifier source_id, an ATSC content identifier, or a global service identifier.

The Name element includes a main AV content name; the ChannelName element includes a channel name of a broadcasted main AV content; the Country element includes country information of a broadcasted main AV content; and the Genre element includes genre information of a main AV content.

The TimeInfo element includes a TotalWatchingTime element and at least one Slot element.

The TotalWatchingTime element includes a main AV content total watching time information.

Since a view may watch one program continuously but may watch a plurality of program alternately, there may be a plurality of watching time slots relating to one program watching. Each Slot element includes information on a watching time slot. The information on a watching time slot includes information on a start time of a watching time slot. The information on a watching time slot may include at least one of information on a duration time of a watching time slot and information on an end time of a watching time slot.

An example of the enhanced service usage information item will be described with reference to FIG. 30.

Figure 30:
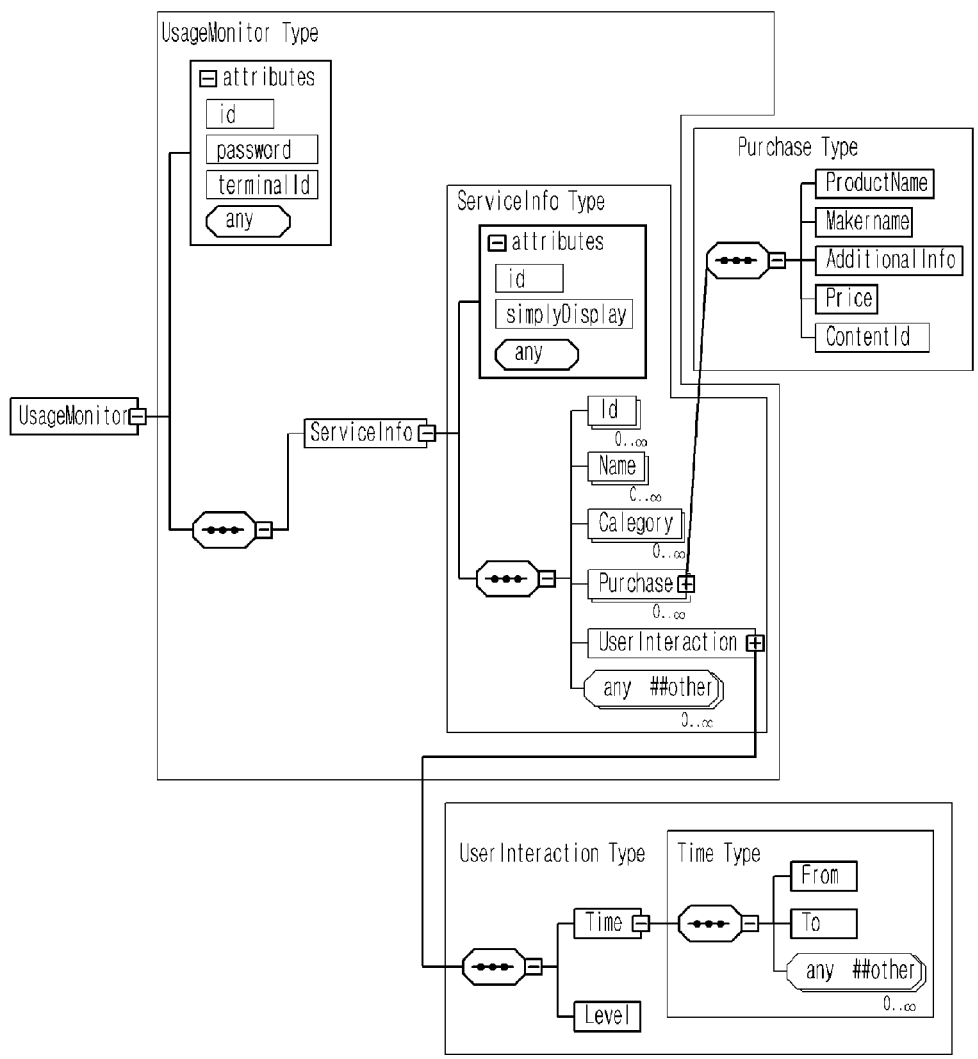
FIG. 30 is an XML schema of an enhanced service usage information item according to an embodiment.

FIG. 30 is an XML schema of an enhanced service usage information item according to an embodiment.

As shown in FIG. 30, a UsageMonitor element corresponding to the enhanced service usage information item includes an id attribute, a password attribute, a terminalID attribute, and a ServiceInfo element.

The ServiceInfo element includes a bound attribute and a simplyDisplay attribute, and an Id element, a Name element, a Category element, a Purchase element, and a UserInteraction element.

The bound attribute is set with bound or unbound. The bound means that an enhanced service is linked with a main AV content, and the unbound means that an enhanced service is not linked with a main AV content.

The simplyDisplay attribute is set with a simple information display or user interaction.

The Id element includes an enhanced service identifier; the Name element includes an enhanced service name; and the category element includes an enhanced service category.

The Purchase element includes a ProductName element, a MakerName element, an AdditionalInfo element, a Price element, and a ContentID element. The ProductName element includes an enhanced service product name; the MakerName element includes a manufacturer name of an enhanced service product; the AdditionalInfo element includes additional information on an enhanced service; the Price element includes price information of an enhanced service product; and a ContentID element includes a content identifier of an enhanced service product.

The UserInteraction element includes a Time element and a Level element.

The Time element includes a From element and a To element. The From element includes an enhanced service usage start time and the To element includes an enhanced service usage end time.

The Level element includes information on no interaction, trigger selection, advertisement content watching, product purchase, and full interaction.

Moreover, as shown in Table 5, contents of the ID element and time element may vary according to a category of an enhanced service.

TABLE 5

| Category | Field Name | Descriptions |
| --- | --- | --- |
| Web Bookmark | TSID | TSID (Transport Stream ID) in currently watching |
| | Set_time | Time for setting Web Bookmark |
| | Follow_time | Time for again accessing Web Bookmark and using enhanced service |
| NRT service | TSID | TSID received/receiving NRT content |
| | Source_id | source_id of NRT content |
| | Service_id | Serviceid of NRT content |
| | Content_linkage | content_linkage of NRT content |
| | Action | Download start/Download end/ Subscribe/Unsubscribe/launching/Terminating |
| | Stat_time | Action start time for NRT content |
| | End_time | Action end time for NRT content (there may be no meaning according to Action) |

As shown in Table 5, if the enhanced service corresponds to a web bookmark service, the Id element includes TSID, and the Time element includes the time for setting a Web Bookmark and the time of when an enhanced service used after accessing the Web Bookmark again.

If the enhanced service corresponds to a non-real-time (NRT) service, the Id element includes TSID, source_id, service_id, and content_linkage, and the Time element includes Action, start_time, and end_time.

The enhanced service management unit 130 logs in the usage information measuring server 80 through account information in operation S2917. This operation may be omitted if necessary.

The enhanced service management unit 130 transmits reporting information to the usage information measuring server 80 corresponding to a reporting address in a reporting period in operation S2919. At this point, the enhanced service management unit 130 transmits the reporting information through HTTP request and terminates the reporting when receiving HTTP reply. Additionally, the enhanced service 130 transmits an HTTP request including a unique identifier such as the identifier of the video display device 100 to the usage information measuring server 80, and transmits reporting information after receiving a reply including a reporting request from the usage information measuring server 80.

The usage information measuring server 80 provides the accumulated usage information to the content providing server 10 in operation S2921, in order to allow the content providing server 10 to use it. Especially, the content providing server 10 provides customizing content and target advertisement, and charges for a bill on the basis of the accumulated usage information.

Moreover, the usage information measuring server 80 may recognize statistical and behavioral characteristics of a user on the basis of viewer information and reported usage information in operation S2923.

The enhanced service management unit 130 obtains various enhanced services on the basis of the obtained user characteristics in operation S2925. A user characteristic based enhanced service will be described with reference to FIGS. 31 to 34. If the usage information measuring server 80 is one module in the video display device 100, the enhanced service management unit 130 may obtain an enhanced service from the enhanced service storage unit 152. If the usage information measuring server 80 is one module in the content providing server 10, the content recognizing service providing server 20, the multi channel video distributing server 30, the enhanced service information providing server 40, the plurality of enhanced service providing servers 50, or the broadcast receiving device 60, it may obtain an enhanced service from a corresponding device.

FIGS. 31 to 34 are conceptual diagrams of a user characteristic based enhanced service according to an embodiment.

As shown in FIG. 31, a user characteristic is that a user enjoys watching a specific AV content. In this case, the enhanced service management unit 130 may obtain an enhanced service that recommends a change to a channel in which a specific AV content is broadcasted. The enhanced service management unit 130 displays the obtained enhanced service, and receives and plays an AV content of a corresponding channel when receiving a user input for channel change confirmation.

Figure 32:
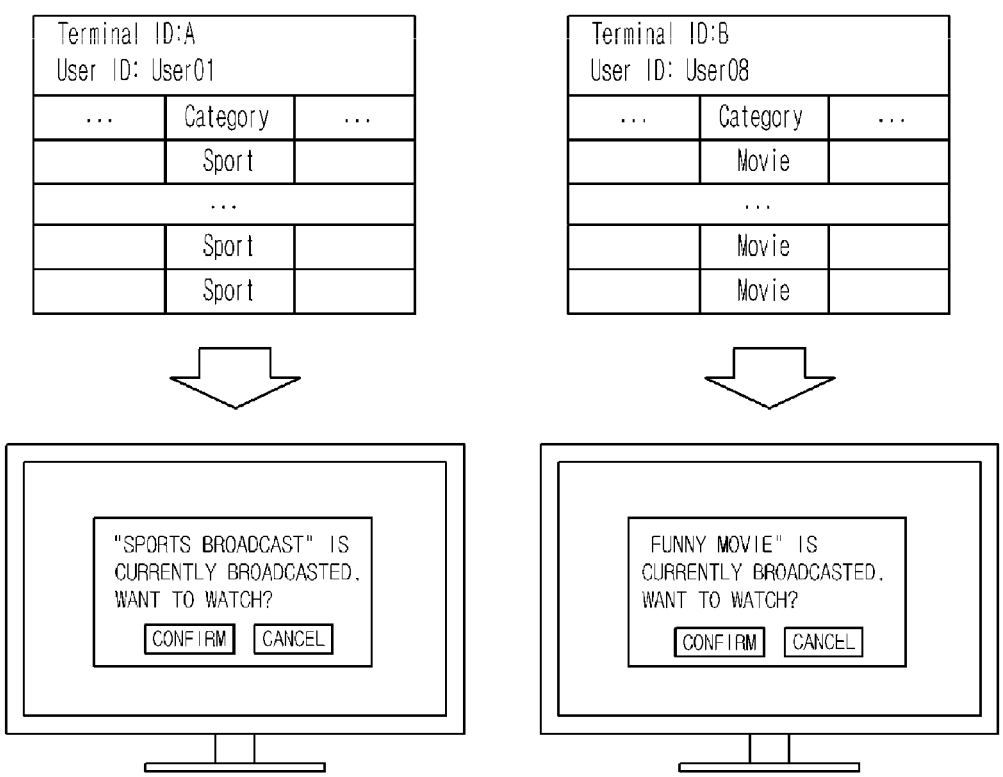

As shown in FIG. 32, a user characteristic is that a user enjoys watching a specific genre. In this case, the enhanced service management unit 130 may obtain an enhanced service that recommends a current AV content or enhanced service corresponding to a user's favorite genre. The enhanced service management unit 130 displays the obtained enhanced service, and receives and plays a corresponding AV content or enhanced service when receiving a user input for watching confirmation.

Figure 33:
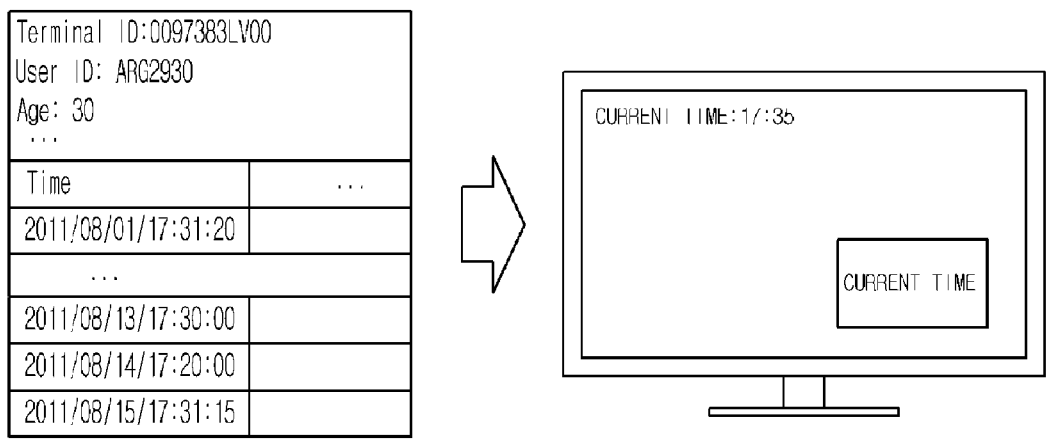

As shown in FIG. 33, a user characteristic is that a user enjoys watching TV at a specific time. In this case, the enhanced service management unit 130 may receive a target advertisement for the specific time that a user usually watches TV, and may play the received target advertisement.

Figure 34:
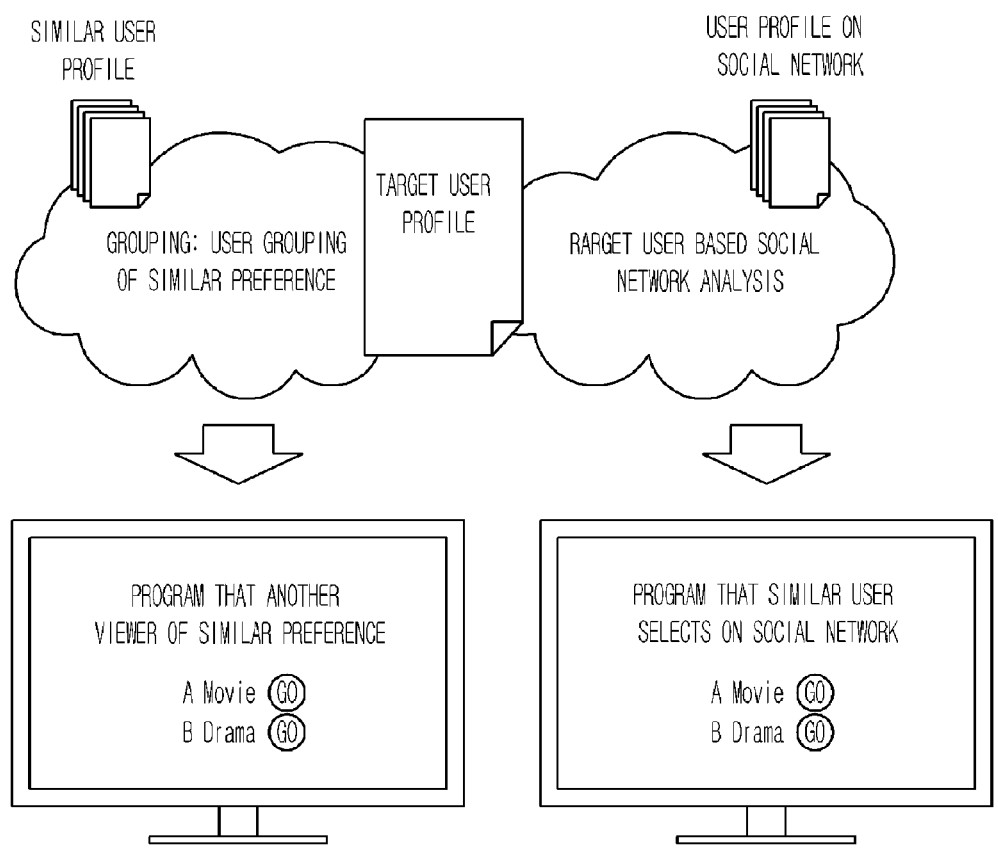

As shown in FIG. 34, users having similar user characteristic may be grouped. On the basis of determining which user of the video display device 100 is included which group, contents or enhanced services that users of a corresponding group prefer most may be recommend. The enhanced service management unit 130 obtains an enhanced service, which recommends an AV content that a user having similar user characteristic selects or watches currently. Additionally, the enhanced service management unit 130 obtains an enhanced service, which recommends an AV content that a similar user on a social network selects or watches currently.

Although the usage information measuring server was described above, the usage information measuring server 80 may be an independent and physical server that is separated from the third party server 90, and the third party server 90 may include a function of the usage information measuring server 80.

Next, a method of providing enhanced service will be described according to another embodiment of the present invention with reference to FIGS. 35 to 42.

Figure 35:
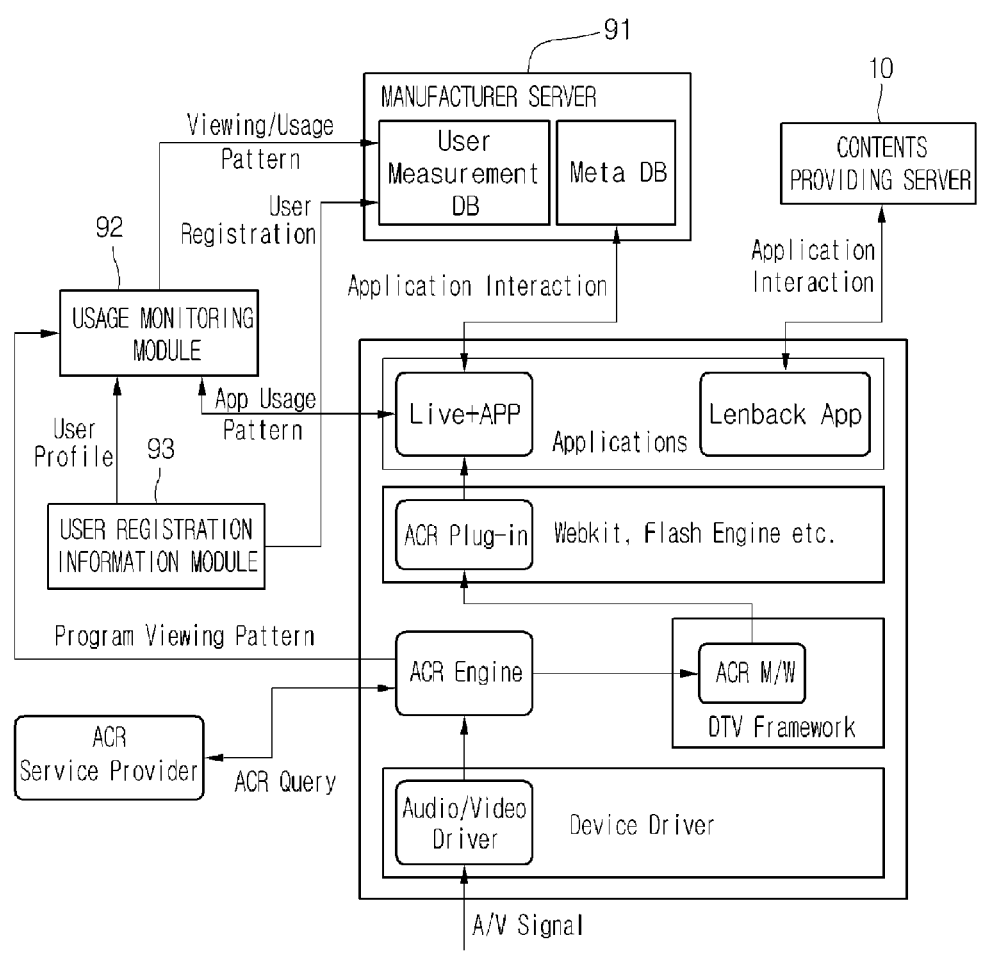
FIG. 35 is a conceptual diagram illustrating a video display device according to an embodiment of the present invention.

FIG. 35 is a conceptual diagram illustrating a video display device according to an embodiment of the present invention.

The manufacturer server 91, as one embodiment of the third party server 90 mentioned herein, may include a metadata storage for providing enhanced service on broadcast contents to a Live+ app, i.e. an application installed in a TV. A data component layer of the third party server 90 may further include a user measurement database storage.

The usage monitoring module 92 monitors the content id and media time of a program that a user watches in real-time through an ACR engine, as described above, and stores the content id and media time of the current program in the user measurement database storage of the third party server 90. Additionally, the usage monitoring module 92, as an enhanced service application, may collect user's usage and interaction information of enhanced service from an enhanced service application and may stores the collected information in a user measurement database storage. The usage monitoring module 92 may be one module in the video display device 100, which is separated from a Live+ app or an ACR engine, or may be one module in a Live+ app. Additionally, the usage monitoring module 92 may be one module of the third party server 90, or may be a separate server distinguished from the third party server 90.

The user registration information module 93 stores information that a user directly inputs in a user measurement database storage of the third party server 90. The user registration information module 93 may be one module in the video display device 100, which is separated from a Live+ app or an ACR engine, or may be one module in a Live+ app. Additionally, the user registration information module 93 may be one module of the third party server 90, or may be a separate server distinguished from the third party server 90.

The contents providing server 10 such as a broadcaster server may establish a user measurement database independently, as one embodiment of a server that a contents provider possesses. The contents providing server 10 may collect user information from the usage monitoring module 92 and the user registration information module 93, or may request user related information to the third party server 90.

Figure 36:
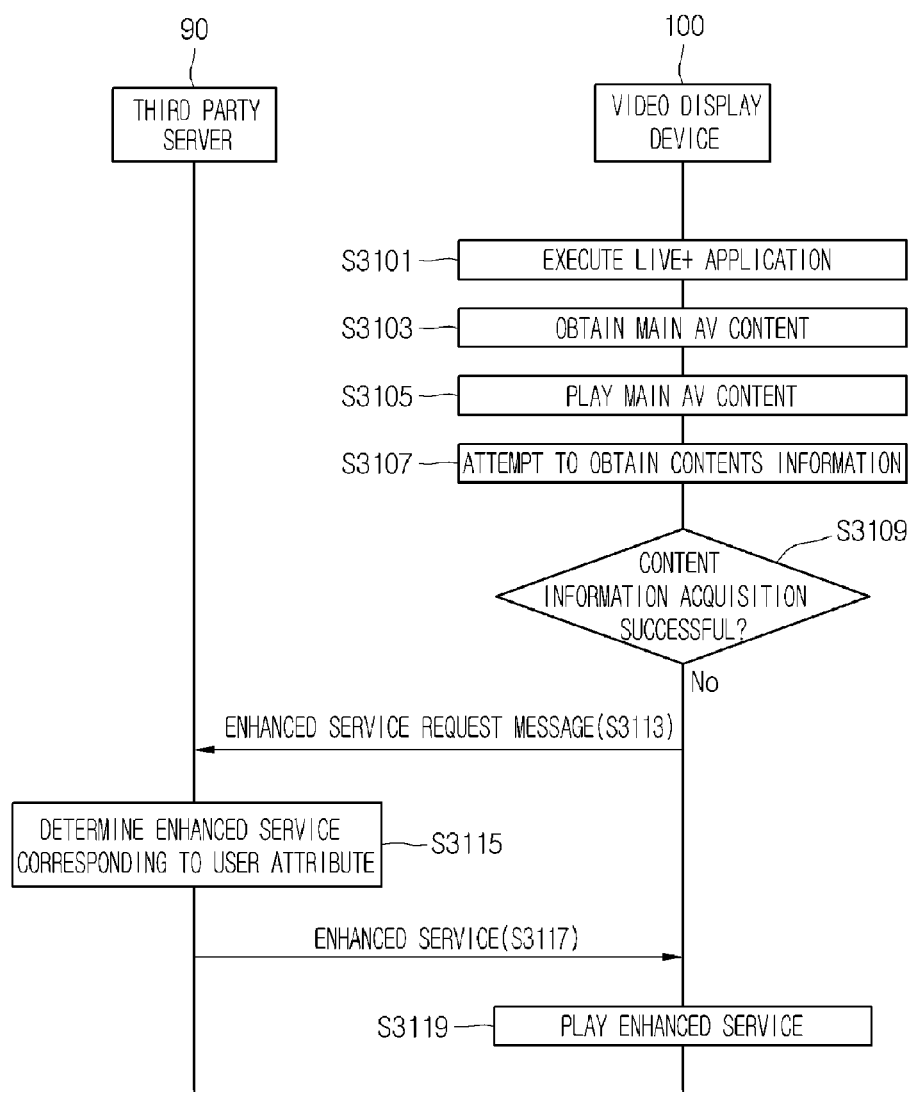
FIG. 36 is a ladder diagram illustrating an operation of a video display device according to another embodiment of the present invention.

FIG. 36 is a ladder diagram illustrating an operation of a video display device according to another embodiment of the present invention.

The video display device 100 executes a Live+ app in operation S3101. As mentioned above, the Live+ app may be an enhanced service playing application independent from any single Channel. Also, the Live+ app may not be executed by a channel change and may not be terminated by a channel change.

The video display device 100 obtains an uncompressed main AV content in operation S3103.

The video display device 100 obtains an uncompressed main AV content in operation S3103.

The video display device 100 attempts to obtain contents information on the uncompressed main AV content on the basis of a portion of the uncompressed main AV content. Like the above-described various embodiments, the video display device 100 attempts to obtain contents information on the uncompressed main AV content on the basis of a portion of the uncompressed main AV content.

The video display device 100 checks whether the contents information on the uncompressed main AV content is successfully obtained in operation S3109.

If the contents information is successfully obtained, the video display device 100 performs the above-described various operations. In one embodiment, a Live+ app executed in the video display device 100 transmits an enhanced service request message including contents information to the third party server 90. As described above, the third party server 90 may be an enhanced service providing server independent from any single channel, and may include enhanced services for a plurality of channels. A third party server may provide an enhanced service corresponding to contents information to a Live+ app of the video display device 100. The Live+ app may play enhanced service corresponding to contents information through the display unit.

Moreover, even when the video display device 100 does not obtain contents information successfully, the Live+ app may need to provide similar enhanced data although not playing scene related information of accurate timing. If the video display device 100 receives more than 100 channels, all of the channels may not support ACR. Since a Live+ app may be an enhanced service playing application that is not dependent on any single channel, is executed by a channel change, and is not terminated by a channel change, even while a user watches a channel that does not support ACR, the Live+ app executed in the video display device 100 may be required to provide similar enhanced data.

Accordingly, when the video display device 100 does not obtain contents information successfully, the Live+ app of the video display device 100 transmits an enhanced service request message not including contents information to the third party server 90 in operation S3113. The enhanced service request message may include information notifying that the video display device 100 does not obtain contents information successfully.

When the enhanced service request message not including contents information is received, the third party server 90 determines an enhanced service corresponding to a user characteristic in operation S3115. Although it will be described later, a user characteristic may correspond to user basic profiles, major watching genres, major watching programs, broadcast watching time slots, frequently-used enhanced services, programs that users having similar preference select, enhanced services that users having similar preference select, or at least one of user input keywords, or may be attributes obtained from at least one thereof.

The third party server 90 may provide the determined enhanced service to the Live+ app of the video display device 100 in operation S3117. The third party server 90 may determine an AV content corresponding to a user characteristic, and may provide an enhanced service relating to the AV content to the Live+ app of the video display device 100. With the additional service request message including information on a user characteristic, the Live+ app of the video display device 100 directly designates a desired user characteristic to obtain a designed additional service. If the additional service request message does not include information on a user characteristic, the third party server 90 may query user characteristic s that it manages in order to provide an enhanced service corresponding to the user characteristic to the Live+ app of the video display device 100.

The Live+ application of the video display device 100 plays an enhanced service relating to an AV content corresponding to a user characteristic in operation S3119.

Then, with reference to FIGS. 37 and 38, an enhanced service relating to an AV content corresponding to a user basic profile will be described.

Figure 37:
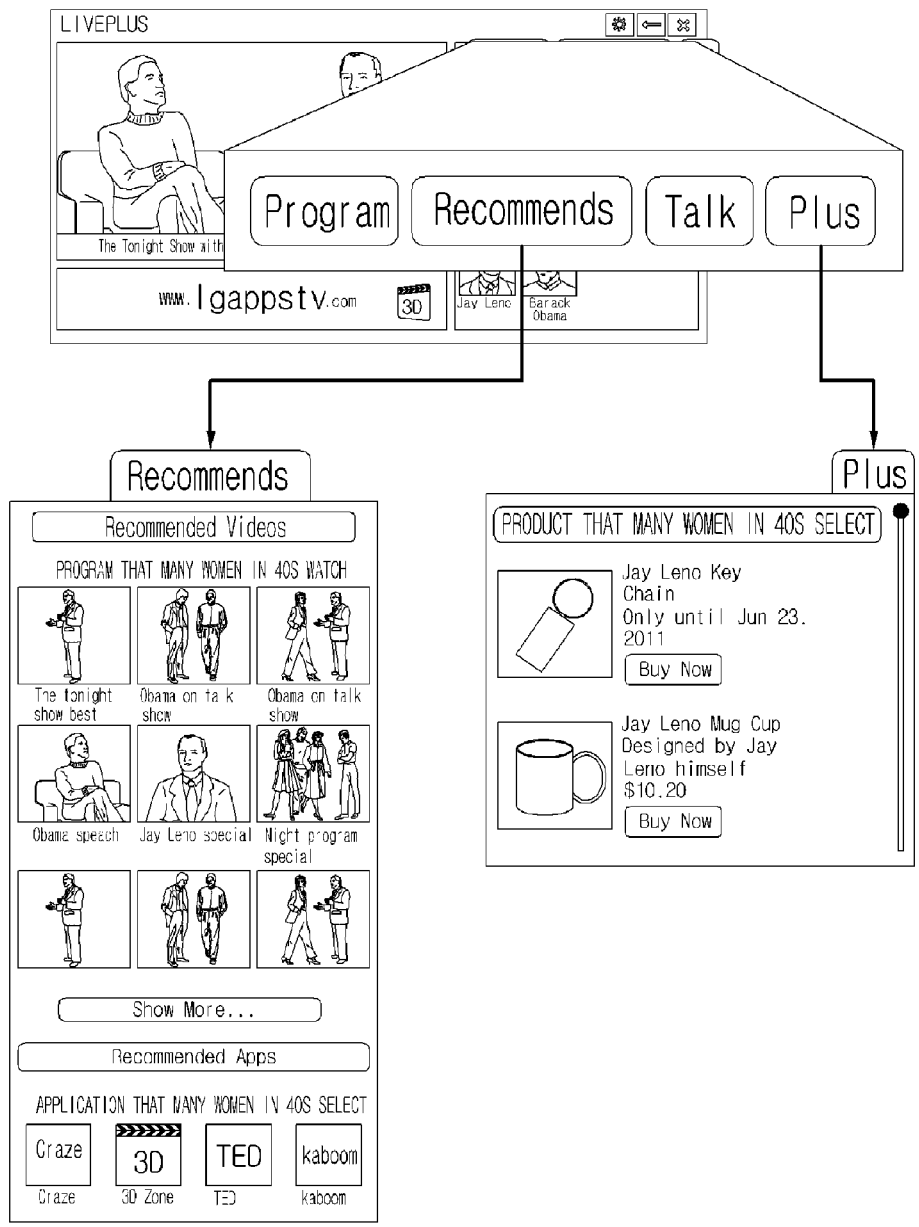
FIG. 37 is a view illustrating a Live+ app that plays an enhanced service relating to an AV content corresponding to a user basic profile according to an embodiment of the present invention.

FIG. 37 is a view illustrating a Live+ app that plays an enhanced service relating to an AV content corresponding to a user basic profile according to an embodiment of the present invention.

The third party server 90 may provide an enhanced service corresponding to one information element in user profile information to the Live+ app of the video display device 100, or may provide an enhanced service corresponding to a combination of a plurality of information elements in user profile information to the Live+ app of the video display device 100.

As shown in FIG. 37, the third party server 90 may provide to the Live+ app an enhanced service corresponding to a combination of an information element on the age of "40s" and an information element on the gender of "women". The third party server 90 may store programs or application that many women in 40s statistically select and information on products in a user measurement database storage, and also may provide such enhancement data at the request of a Live+ app. FIG. 38 is a view illustrating a Live+ app that plays an enhanced service relating to an AV content corresponding to a user basic profile according to another embodiment of the present invention.

Figure 38:
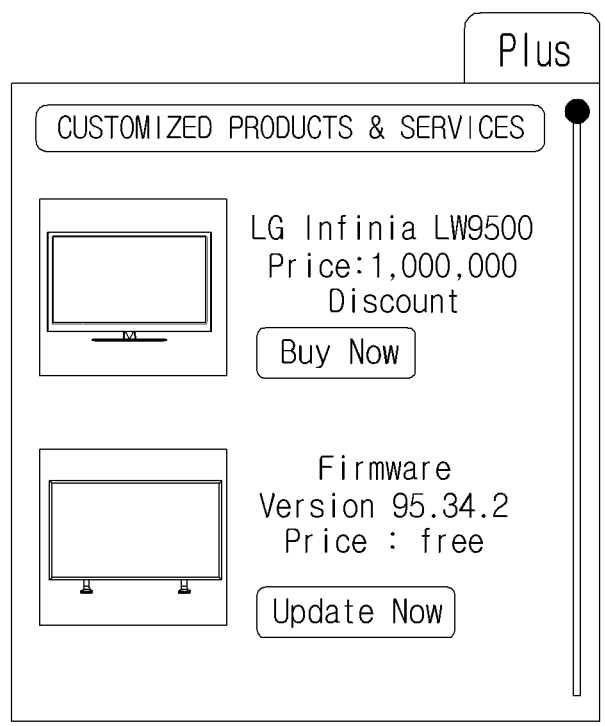
FIG. 38 is a view illustrating a Live+ app that plays an enhanced service relating to an AV content corresponding to a user basic profile according to another embodiment of the present invention.

As shown in FIG. 38, the third party server 90 may provide to the Live+ app an enhanced service corresponding to an information element such as the model or firmware version of a TV. At this point, the enhanced service corresponding to an information element such as the model or firmware version of a TV may include at least one of firmware update information, detailed information on an updated TV model, purchase information of the TV model, and discount coupon information for TV model purchase.

Figure 39:
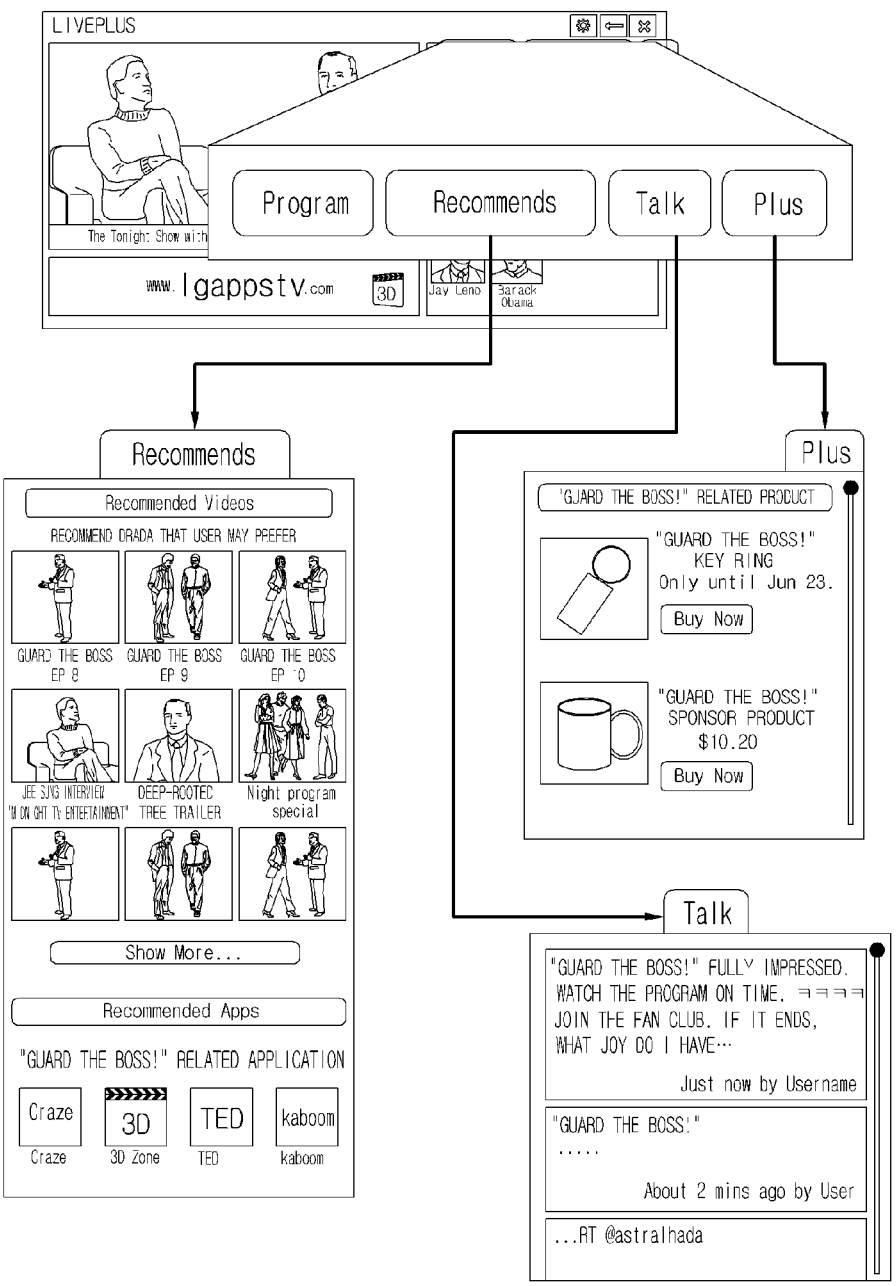
FIG. 39 is a view illustrating a Live+ app that plays an enhanced service when contents information is not obtained successfully according to another embodiment of the present invention.

FIG. 39 is a view illustrating a Live+ app that plays an enhanced service when contents information is not obtained successfully according to another embodiment of the present invention.

As shown in FIG. 39, the third party server 90 may provide to the Live+ app an enhanced service corresponding to a major watching genre and/or a main watching program, after storing user's major watching genres and major watching programs of the video display device 10 in advance.

Especially, as shown in FIG. 39, the third party server 90 may provide to the Live+ app an enhanced service corresponding to a major watching genre and/or a main watching program at the current time, after storing user's major watching genres and major watching programs of the video display device 100 for a plurality of time slots in advance.

Additionally, the third party server 90 may provide the major usage enhanced service to the Live+ app after realizing an enhanced service in advance that a user of the video display device 100 frequently uses. For example, if a user frequently uses a program related music purchase service, the third party server 90 may provide music purchase service to a Live+ app.

Additionally, the third party server 90 may provide to a Live+ app an enhanced service corresponding to a currently watching program of a user having a similar preference to a user of the video display device 100. At this point, the similar preference may mean that at least one of a major watching genre, a major watching program, and a major usage enhanced service matches.

Additionally, the third party server 90 may provide to a Live+ app an enhanced service corresponding to at least one of a user's currently watching program, major watching program, major watching genre, major watching program, and major usage enhanced service in a user's SNS of the video display device 100.

Figure 40:
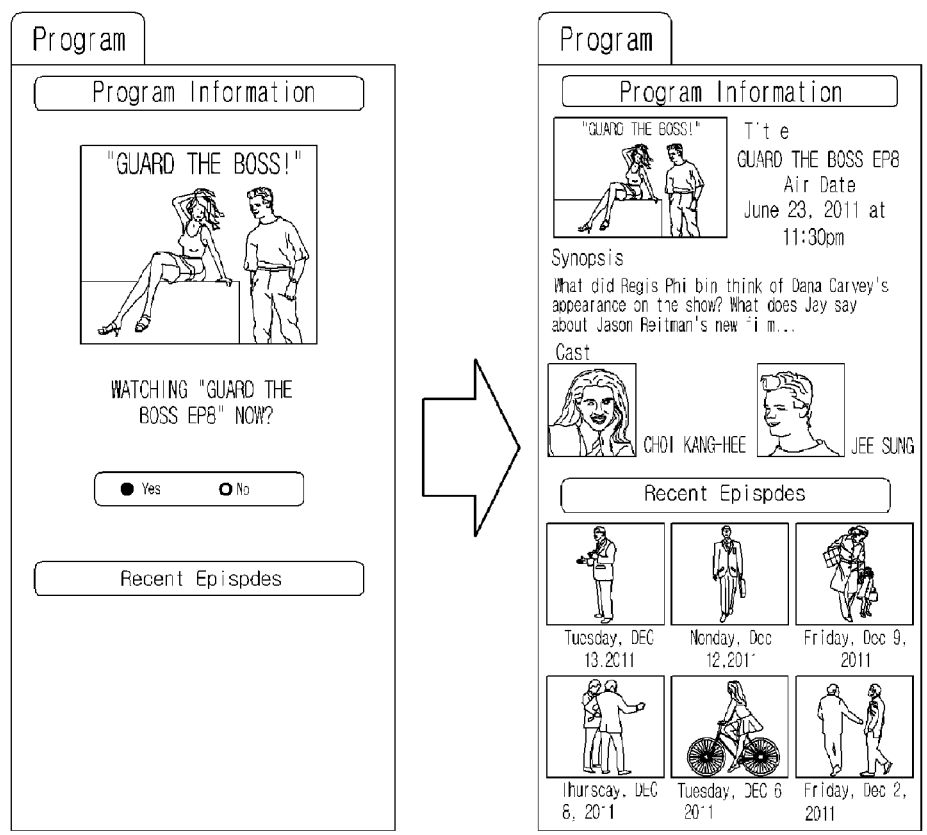
FIG. 40 is a view illustrating a Live+ app that plays an enhanced service when contents information is not obtained successfully according to another embodiment of the present invention.

FIG. 40 is a view illustrating a Live+ app that plays an enhanced service when contents information is not obtained successfully according to another embodiment of the present invention.

A program tab of a Live+ app provides basic information on a program that a viewer watches currently and a replay service of a current program. If the contents identification is failed, since the video display device 100 does not know the current program, the Live+ app may not display anything on the program tab often.

When a subsequent series of a program that a user watched at a past time slot corresponding to a current time slot is programmed at the current time slot, a Live+ app may display a graphic user interface that queries whether to watch this program to a user. When the program watching is confirmed through the graphic user interface, the Live+ app requests an enhanced service relating to the program to the third party server 90, and then, receives the requested enhanced service from the third party server 90. According to another embodiment, a graphic user interface that queries whether to watch the program to a user may not be displayed. The Live+ app may display on a program tab an enhanced service relating to the watching confirmed program.

Figure 41:
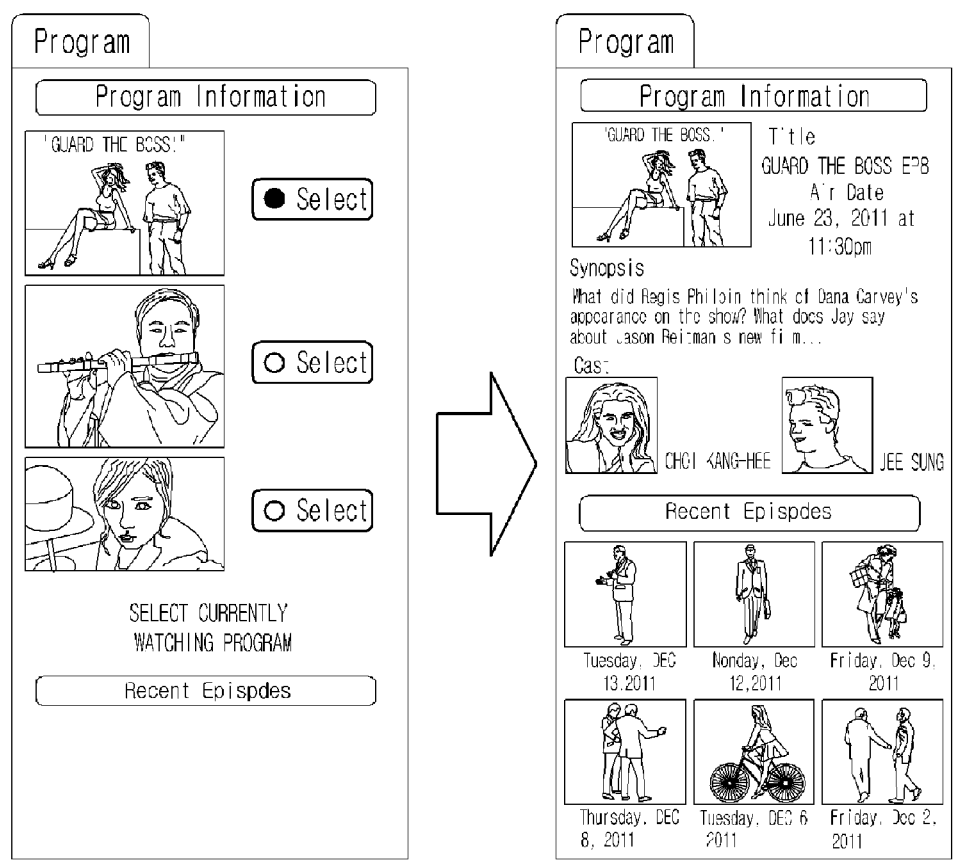
FIG. 41 is a view illustrating a Live+ app that plays an enhanced service when contents information is not obtained successfully according to another embodiment of the present invention.

FIG. 41 is a view illustrating a Live+ app that plays an enhanced service when contents information is not obtained successfully according to another embodiment of the present invention.

The third party server 90 may provide to the Live+ app of the video display device 100 a broadcast program schedule including information on a plurality of programs programmed at the current time slot or information on a plurality of programs programmed at the current time slot.

As shown in FIG. 41, the Live+ app of the video display device 100 may display a graphic user interface that queries to select a currently watching program from a plurality of programs programmed at the current time slot. When the program watching is confirmed among a plurality of programs programmed at the current time slot through the graphic user interface, the Live+ app requests an enhanced service relating to the program to the third party server 90, and then, receives the requested enhanced service from the third party server 90. The Live+ app may display on a program tab an enhanced service relating to the watching confirmed program.

Figure 42:
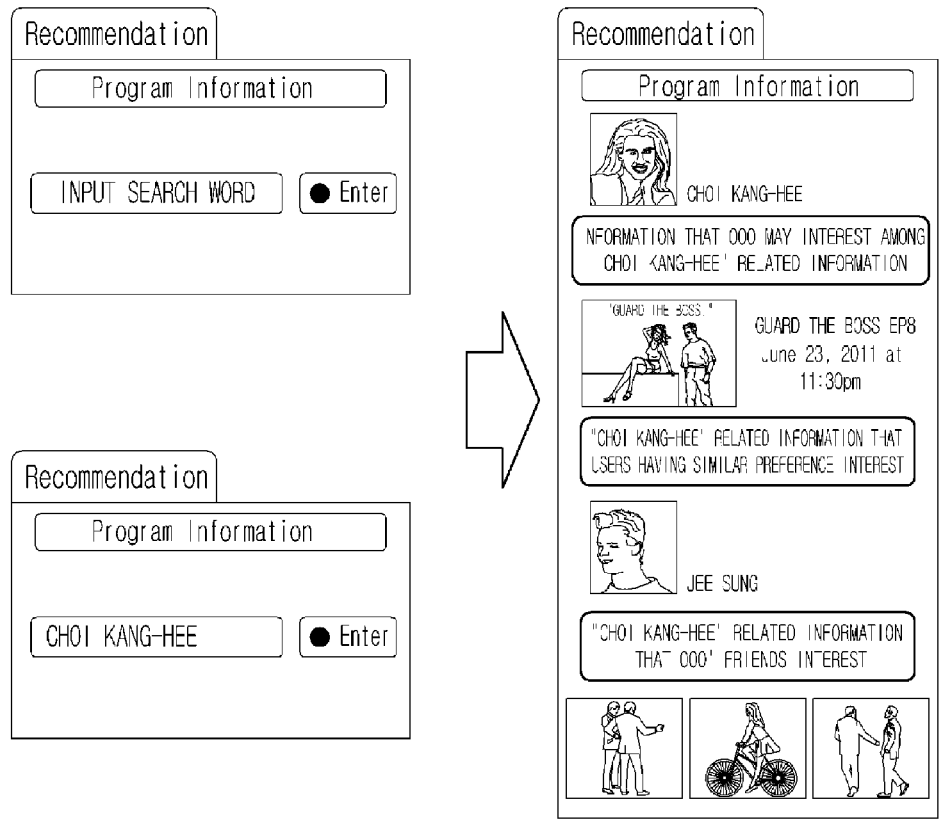
FIG. 42 is a view illustrating a Live+ app that plays an enhanced service when contents information is not obtained successfully according to another embodiment of the present invention.

FIG. 42 is a view illustrating a Live+ app that plays an enhanced service when contents information is not obtained successfully according to another embodiment of the present invention.

If the video display device 100 does not obtain the contents information successfully obtained, the Live+ app of the video display device 100 may display an input window of a search keyword. Once a search keyword is inputted to the search keyword input window, the Live+ app of the video display device 100 may transmit an enhanced service request message including the keyword to the third party server 90.

On receiving the enhanced service request message including the search keyword, the third party server 90 may determine at least one of a user basic profile, a major watching genre, a major watching program, a broadcast watching time slot, a frequently used enhanced service, a program that users having similar preference select, and an enhanced service that users having similar preference select, and also an enhanced service corresponding to a combination of search keywords, and then may provide the enhanced service to the Live+ app of the video display device 100.

In more detail, on receiving the enhanced service request message including the search keyword, the third party server 90 may obtain a search result on the basis of the search keyword, and then may process the search result on the basis of at least one of a user basic profile, a major watching genre, a major watching program, a broadcast watching time slot, a frequently used enhanced service, a program that users having similar preference select, and an enhanced service that users having similar preference select. Therefore, the third party server 90 may provide the enhanced service including the processed search result to the Live+ app of the video display device 100. For example, when the search keyword is an actor's name and the search result includes a plurality of items corresponding to the actor's name, the third party server 90 places a search item corresponding to a user's major watching program among the plurality of search items, on the top and then, processes the search result.

Moreover, on receiving the enhanced service request message including the search keyword, the third party server 90 may determine at least one of a user basic profile, a major watching genre, a major watching program, a broadcast watching time slot, a frequently used enhanced service, a program that users having similar preference select, and an enhanced service that users having similar preference select, and also an AV content corresponding to a combination of search keywords, and then may provide the enhanced service corresponding to the AV content to the Live+ app of the video display device 100.

Additionally, the third party server 90 may generate an enhanced service by using inference rules and then may provide it to the Live+ app of the video display device 100. That is, the third party server 90 may deduce a user characteristic by applying the inference rules to a user's basic profile. For example, the following inference rules may be used:

men in 40s prefer an electronic product.
men in 40s is affordable to purchase a product of more than one million one.
men prefer the sports genre.
women between the ages of 15 to 20 often agree with users in a social network.
women over the age of 15 prefers the drama genre.

The third party server 90 may provide an enhanced service corresponding to a user characteristic to a Live+ app of the video display device 100. Especially, the third party server 90 may determine an AV content corresponding to a user characteristic, and may provide an enhanced service relating to the AV content to the Live+ app of the video display device 100.

Furthermore, when the content information is obtained successfully, the third party server 90 may provide an enhanced service corresponding to a combination of the content information and the user characteristic to the Live+ app of the video display device 100. For example, when the enhanced service corresponding to the content information includes a plurality of items, the third party server 90 may provide an enhanced service including a item corresponding to a user characteristic on the top among the plurality of items to the Live+ app of the video display device 100.

First, each of a plurality of video display devices collects a main AV content watching information item as shown in FIG. 29 in operation S3301. At this point, an XML schema of the main AV content watching information item shown in FIG. 29 may be, extended as shown in Table 6.

TABLE 6

```
<TimeInfo>
    <TotalWatchingTime />
    <CurrentSystemTime>
        <Day>2012.01.10 </Day>
        <SystemTime>  11:47:00</SystemTime>
    </CureentSystemTime>
</TimeInfo>
```

As shown in Table 6, a video display device inserts system time information at the timing of when a main AV content watching information item is collected into the main AV content watching information item.

Each video display device provides a plurality of collected main AV content watching information items to the third party server 90 in batch in operation S3303. At this point, each video display device may further provide information on a user profile to the third party server 90.

The third party server 90 receives a plurality of main AV content watching information items from a plurality of video display devices, and on the basis of this, generates audience rating information in operation S3305. Since each main AV content watching information item includes the timestamp of the main AV content and system time information, the third party server 90 may identify whether the main AV content is viewed in real-time viewing, time-shifted viewing, or delayed viewing such as VOD or media file viewing. For example, if the main AV content is not broadcasted in the present and past, the third party server 90 may confirm that the main AV content is viewed as delayed viewing. If the main AV content is broadcasted and a difference between the time stamp of the main AV content and the system time information is out of a predetermined range, the third party server 90 may confirm that the main AV content is viewed as time-shifted viewing. If the main AV content is broadcasted and a difference between the time stamp of the main AV content and the system time information is within a predetermined range, the third party server 90 may confirm that the main AV content is viewed as real-time viewing.

When receiving information on a user profile in addition to the main AV content watching information item, the third party server 90 may generate audience rating information according to each information component in the user profile. For example, the third party server 90 may generate audience rating information according to gender, audience rating information according to ages, audience rating information according to gender and ages, and audience rating information according to residential areas.

Additionally, since the main AV content watching information item includes information on genre, the third party server 90 may generate audience rating information according to genre.

Thus, the third party server 90 generates enhanced audience rating information including at least one of audience rating information according to genre, audience rating information according to a user profile, real-time viewing audience rating information, time-shifted viewing audience rating information, and delayed viewing audience rating information, and provides this to the Live+ app of the video display device 100 in operation S3307.

When the Live+ app of the video display device 100 receives the enhanced audience rating information, it may display the enhanced audience rating information on a recommends tab in operation S3309.

A user may select a program for watching by using the enhanced audience rating. That is, a user may select a program for watching by using at least one of audience rating information according to genre, audience rating information according to a user profile, real-time viewing audience rating information, time-shifted viewing audience rating information, and delayed viewing audience rating information.

When a user selects a program for watching by using at least one of audience rating information according to genre, audience rating information according to a user profile, real-time viewing audience rating information, time-shifted viewing audience rating information, and delayed viewing audience rating information, the video display device 100 may play the selected program as main AV content in operation S3311. For example, when the selected program is a real-time viewing program, the video display device 100 may play a program selected by a channel change. Additionally, if the selected program is a time-shifted viewing program or a delayed viewing program, the video display device 100 may receive and play a corresponding program after requesting the selected program via an IP based network.

Next, a structure of a video display device according to various embodiments will be described with reference to FIGS. 43 and 44.

Figure 43:
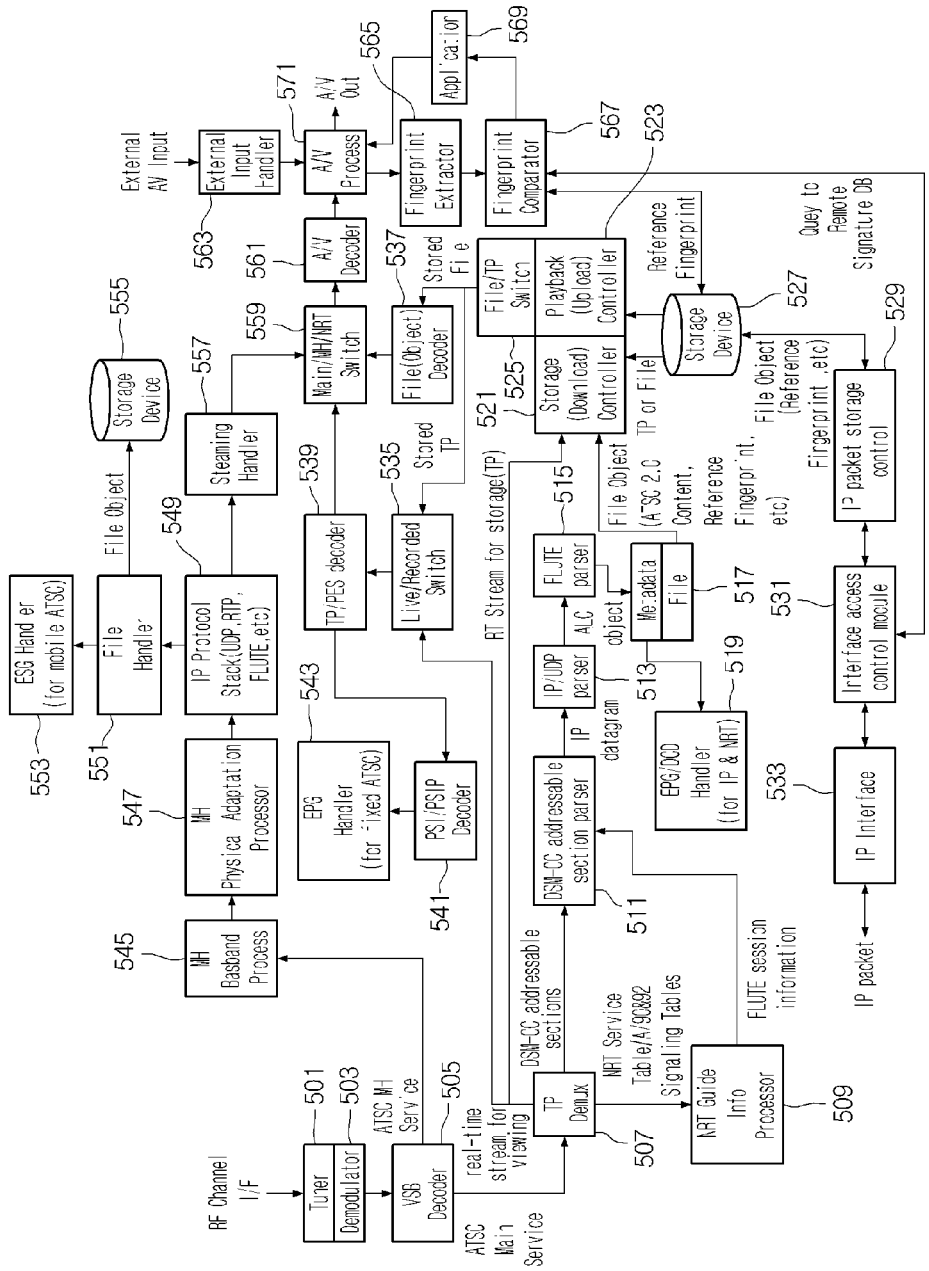
FIG. 43 is a block diagram illustrating a structure of a fingerprint based video display device according to another embodiment.

FIG. 43 is a block diagram illustrating a structure of a fingerprint based video display device according to another embodiment.

As shown in FIG. 43 a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the AN decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler, is delivered to the Descrambler, and then, the descrambler descrambles MPEG-2 TP or IP Datagram, which carriers AN Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint feature information from an AV stream.

The Fingerprint Comparator 567 compares the feature information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

Figure 44:
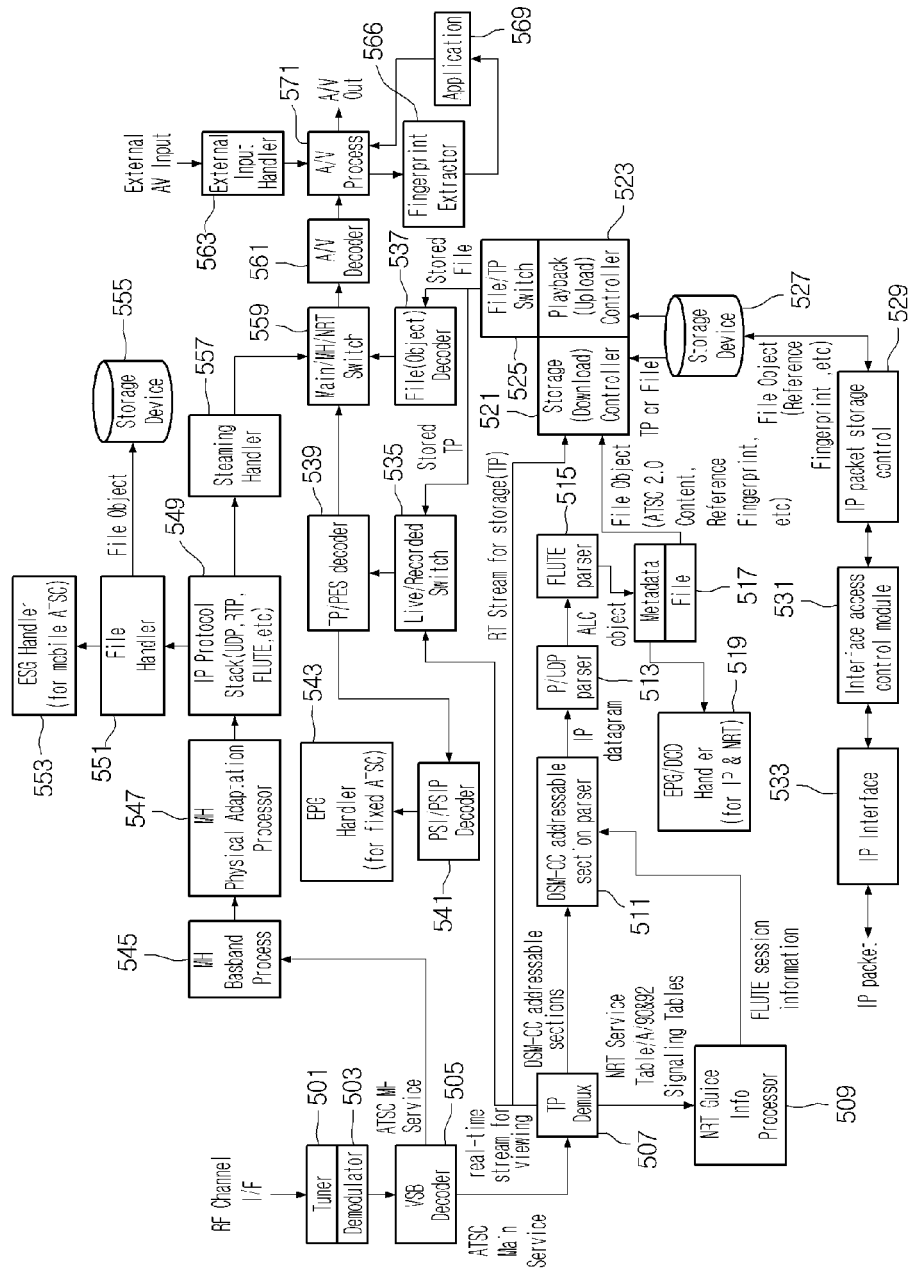
FIG. 44 is a block diagram illustrating a structure of a watermark based video display device according to another embodiment.

FIG. 44 is a block diagram illustrating a structure of a watermark based video display device according to another embodiment.

Although the watermark based video display device of FIG. 44 is similar to the fingerprint based video display device of FIG. 43, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

According to an embodiment, enhanced services not dependent on an MVPD are available. Especially, even when a broadcaster or a contents provider does not provide enhanced services, a third party server not dependent on the broadcaster or the contents provider may provide the enhanced services.

Moreover, according to embodiments, information search, chatting, news search, digital media download, product catalog download, and product purchase, which are related to main AV contents, are available without inconvenient text input using a remote controller.

Additionally, according to embodiments, enhanced services exceeding the bandwidth limitation of a wireless channel become available.

Moreover, the above methods of the present invention can also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A video display device comprising:
a tuner configured to receive a broadcasting signal;
a receiver configured to receive an uncompressed audio or video (AV) content; and
an enhanced service manager circuit configured to extract characteristic information from a part of the uncompressed AV content, wherein the characteristic information includes at least one of a watermark and a fingerprint, transmit a first query to a first server, wherein the first query corresponds to the characteristic information, receive a first response corresponding to the first query from the first server, transmit a second query to a second server based on the first response, receive a second response corresponding to the second query from the second server, receive an application, for outputting an enhanced service, based on the second response, and execute the application based on the second response,
wherein the first response includes a timestamp of the part of the uncompressed AV content and an address of the second server, and
the second response includes an address of the application, request period for the application and information on an acquisition path of the application.

2. The video display device according to claim 1, wherein the enhanced service manager circuit outputs a menu for selecting the enhanced service through the application for recommending.

3. The video display device according to claim 2, wherein the menu comprises a program menu for outputting information on the uncompressed AV content, wherein the enhanced service manager circuit outputs a content metadata and a replay service of the uncompressed AV content, when the program menu is selected.

4. The video display device according to claim 2, wherein the menu comprises a recommending menu for recommending related to the uncompressed AV content, and wherein the enhanced service manager circuit outputs a recommending content or a recommending application which is related to at least one of a title, a genre and an actor of the uncompressed AV content, when the recommend menu is selected.

5. The video display device according to claim 4, wherein the enhanced service manager circuit obtains a user characteristic which represents a preference of a user, and outputs the recommending content and the recommending application based on the user characteristic, and wherein the user characteristic includes at least one of a user basic profile, a major watching genre, a major watching program, a broadcast watching time slot and a keyword which is inputted by the user.

6. The video display device according to claim 5, wherein the enhanced service manager circuit obtains information on a group of the user who watched the uncompressed AV content, based on the user characteristic and outputs the recommending content and the recommending application based on the group.

7. The video display device according to claim 2, wherein the menu comprises a talk menu for outputting an online article related to the uncompressed AV content, and wherein the enhanced service manager circuit outputs a SNS (Social Network Service) article which is related to at least one of a title, a genre and an actor of the uncompressed AV content, when the talk menu is selected.

8. The video display device according to claim 2, wherein the menu comprises a plus menu for representing an enhanced data related the uncompressed content, and wherein the enhanced service manager circuit outputs information on a goods or a place which is related to the uncompressed AV content.

9. The video display device according to claim 1, wherein the enhanced service manager circuit receives audience rating information from the second server and outputs the audience rating information.

* * * * *